US012647019B2

(12) United States Patent
Abolhassani et al.

(10) Patent No.: US 12,647,019 B2
(45) Date of Patent: Jun. 2, 2026

(54) CONFIGURABLE POWER MODULE FOR AC AND DC APPLICATIONS

(71) Applicant: Eaton Intelligent Power Limited, Dublin (IE)

(72) Inventors: Mehdi Abolhassani, Houston, TX (US); Lyle T. Keister, Athens, GA (US); Josh Keister, Athens, GA (US)

(73) Assignee: Eaton Intelligent Power Limited, Dublin (IE)

( * ) Notice: Subject to any disclaimer, the term of this patent is extended or adjusted under 35 U.S.C. 154(b) by 69 days.

(21) Appl. No.: 18/067,032

(22) Filed: Dec. 16, 2022

(65) Prior Publication Data

US 2023/0121403 A1     Apr. 20, 2023

Related U.S. Application Data

(62) Division of application No. 17/393,481, filed on Aug. 4, 2021, now Pat. No. 11,557,957.

(51) Int. Cl.
| | |
|---|---|
| *H02M 1/40* | (2007.01) |
| *B60L 53/10* | (2019.01) |
| *H02M 1/00* | (2007.01) |
| *H02M 1/32* | (2007.01) |
| *H02M 5/458* | (2006.01) |

(52) U.S. Cl.
CPC ............. *H02M 1/009* (2021.05); *B60L 53/10* (2019.02); *H02M 1/008* (2021.05); *H02M 1/327* (2021.05); *B60L 2210/12* (2013.01); *B60L 2210/14* (2013.01); *B60L 2210/20* (2013.01); *B60L 2210/40* (2013.01)

(58) Field of Classification Search
CPC ...... H02M 1/009; H02M 1/327; H02M 1/008; B60L 53/10; B60L 2210/12; B60L 2210/14; B60L 2210/20; B60L 2210/40
USPC .......................................................... 320/109
See application file for complete search history.

(56) References Cited

U.S. PATENT DOCUMENTS

| | | | |
|---|---|---|---|
| 5,642,270 A | 6/1997 | Green et al. | |
| 9,780,682 B2 | 10/2017 | Keister et al. | |

(Continued)

FOREIGN PATENT DOCUMENTS

| | | |
|---|---|---|
| DE | 102019124330 | 3/2021 |
| WO | 2019199964 | 10/2019 |

OTHER PUBLICATIONS

Chargepoint, Inc., CT 4000 Family, ChargePoint Level 2 Commercial Charging Stations, 2021, pp. 1-4.

(Continued)

*Primary Examiner* — Daniel Cavallari
*Assistant Examiner* — Swarna N Chowdhuri
(74) *Attorney, Agent, or Firm* — Stanek Lemon Crouse & Meeks, PA

(57) ABSTRACT

In an embodiment, a power module may include: a plurality of first stages, each having an H-bridge to receive an incoming AC voltage at a first frequency and rectify the incoming AC voltage to a DC voltage; a plurality of DC buses, each to receive the DC voltage from one of the plurality of first stages; a plurality of second stages, each coupled to one of the plurality of DC buses to receive the DC voltage and output a second AC voltage at a second frequency; and a hardware configuration system having fixed components and optional components to provide different configurations for the power module.

19 Claims, 20 Drawing Sheets

(56)                    References Cited

U.S. PATENT DOCUMENTS

|  |  |  |
|---|---|---|
| 9,906,155 B2 | 2/2018 | Keister et al. |
| 10,131,239 B2 | 11/2018 | Herke et al. |
| 10,608,545 B2 | 3/2020 | Keister et al. |
| 10,696,183 B2 | 6/2020 | Roggendorf et al. |
| 10,811,988 B2 | 10/2020 | Keister et al. |
| 11,292,352 B1 | 4/2022 | Keister et al. |
| 2003/0038612 A1 | 2/2003 | Kutkut |
| 2004/0070354 A1 | 4/2004 | Krueger |
| 2011/0273917 A1 | 11/2011 | Maitra et al. |
| 2016/0176305 A1* | 6/2016 | James ................. H02J 3/38 |
|  |  | 307/26 |
| 2017/0099008 A1 | 4/2017 | Keister et al. |
| 2017/0353177 A1 | 12/2017 | Xu et al. |
| 2018/0198377 A1 | 7/2018 | Keister et al. |
| 2018/0339601 A1 | 11/2018 | Kruszelnicki |
| 2019/0135116 A1* | 5/2019 | Narla ................. H02J 3/381 |
| 2019/0270526 A1* | 9/2019 | Hehn ................. B60L 53/18 |
| 2020/0062125 A1 | 2/2020 | Brauner et al. |
| 2020/0185847 A1 | 6/2020 | Feldner et al. |
| 2020/0220355 A1 | 7/2020 | Xie et al. |
| 2020/0328613 A1* | 10/2020 | Reinger ................. H01M 10/44 |
| 2020/0378858 A1* | 12/2020 | Curtis ................. F17D 5/06 |
| 2021/0291687 A1 | 9/2021 | Ferguson et al. |
| 2021/0297001 A1 | 9/2021 | Bakran et al. |
| 2021/0300192 A1* | 9/2021 | Cho ................. B60L 53/12 |
| 2022/0185132 A1* | 6/2022 | Næsje ................. H01R 12/716 |
| 2023/0110735 A1* | 4/2023 | Akiyama ............ F04D 27/0261 |
|  |  | 417/423.8 |
| 2023/0127473 A1* | 4/2023 | Yu ................. G01L 1/148 |
|  |  | 73/777 |

OTHER PUBLICATIONS

Tesla; Supercharging Tesla, 2021, pp. 1-7.
U.S. Patent Office, Office Action, mailed Jun. 9, 2022, in U.S. Appl. No. 17/676,491 (18 Pages).
EP Patent Office, International Search Report and Written Opinion mailed Nov. 17, 2022 in PCT Application No. PCT/US202/038754, 14 Pgs.
U.S. Patent Office, Final Office Action, mailed Sep. 28, 2022, in U.S. Appl. No. 17/676,491 (12 Pages).

* cited by examiner

CONFIGURABLE POWER MODULE FOR AC AND DC APPLICATIONS

CROSS-REFERENCE TO RELATED APPLICATIONS

The present application is a divisional of U.S. patent application Ser. No. 17/393,481, filed on Aug. 4, 2021, the content of which is hereby incorporated by reference.

BACKGROUND

Various power conversion systems are used to convert and condition power, to more efficiently provide power from a given power source. Regardless of the type, these systems are typically formed of multiple power converters, often implemented as modules. While these modules can be desirably customized for particular applications, there are not standard modules that can be used in different applications.

SUMMARY OF INVENTION

In one aspect, a power module for use in a power conversion system is provided. The power module may include: a plurality of first stages, each of the plurality of first stages comprising an H-bridge to receive an incoming AC voltage at a first frequency and rectify the incoming AC voltage to a DC voltage; a plurality of DC buses, each of the plurality of DC buses coupled to receive the DC voltage from one of the plurality of first stages; a plurality of second stages, each of the plurality of second stages coupled to one of the plurality of DC buses to receive the DC voltage and output a second AC voltage at a second frequency; and a hardware configuration system having fixed components, where the power module is a configurable module.

When the configurable module is adapted in a first power conversion system, the hardware configuration system includes the fixed components and optional components; and when the configurable module is adapted in a second power conversion system, the hardware configuration system includes the fixed components and not the optional components.

In an example, the fixed components comprise a plurality of jumper connector points, and when the configurable module is adapted in the second power conversion system the plurality of jumper connector points are unconnected, and when the configurable module is adapted in the first power conversion system the optional components comprising one or more jumpers are coupled to at least some of the plurality of jumper connector points.

In an example, when the configurable module is adapted in the first power conversion system, the plurality of first stages are coupled in series via the one or more jumpers coupled to the at least some of the plurality of jumper connection points.

In an example, the one or more jumpers comprise a first set of jumpers to serialize the plurality of first stages.

In an example, the one or more jumpers further comprise a second set of the jumpers coupled to the plurality of first stages to enable a bypass operation to occur.

In an example, the power module further comprises a controller coupled to the plurality of first stages and the plurality of second stages, where the controller, in a first mode, is to configure the power module for unidirectional power flow, and, in a second mode, is to configure the power module for bidirectional power flow.

In an example, the power module further comprises a circuit board on which the plurality of first stages, the plurality of DC buses, the plurality of second stages, the hardware configuration system, and the controller are adapted.

In an example, the circuit board comprises a central portion on which the controller is adapted, a first peripheral portion on which the plurality of first stages are adapted, and a second peripheral portion on which the plurality of second stages are adapted.

In an example, the power module further comprises: a first plurality of independent heat sinks, each of the first plurality of independent heat sinks associated with one of a first plurality of switches of the plurality of first stages; and a second plurality of independent heat sinks, each of the second plurality of independent heat sinks associated with one of a second plurality of switches of the plurality of second stages.

In an example, the circuit board is foldable such that the first peripheral portion and the second peripheral portion fold inwardly to oppose each other, and the circuit board, when folded, is an enclosure for the power module.

In an example, when the configurable module is adapted in the first power conversion system, the configurable module is configured as an AC-AC converter; and when the configurable module is adapted in the second power conversion system, the configurable module is configured as an DC-AC converter.

In another aspect, a power module comprises: a circuit board having a plurality of layers comprising conductive traces; a plurality of low frequency (LF) bridge circuits adapted on a first portion of the circuit board, each of the plurality of LF bridge circuits to receive an incoming voltage and output a DC voltage; a plurality of DC buses adapted on the circuit board, each of the plurality of DC buses coupled to receive the DC voltage from one of the plurality of LF bridge circuits; a plurality of high frequency (HF) bridge circuits adapted on a second portion of the circuit board, each of the plurality of HF bridge circuits coupled to one of the plurality of DC buses to receive the DC voltage and output a second voltage; and a controller adapted on a third portion of the circuit board, the third portion located between the first portion and the second portion, and wherein the circuit board is foldable such that when folded, the circuit board forms an enclosure for the power module.

In an example, the power module comprises a configurable power module, and: when the configurable power module is included in a first power conversion system, each of the plurality of LF bridge circuits is to receive the incoming voltage comprising the DC voltage; and when the configurable power module is included in a second power conversion system, each of the plurality of LF bridge circuits is to receive the incoming voltage comprising an AC voltage and rectify the AC voltage to the DC voltage.

In an example, the controller is to configure the power module for provision of a charging DC voltage to an EV charging system, wherein the power module further comprises a plurality of jumpers coupled to a plurality of jumper connection points adapted on the circuit board, to couple a midpoint of the plurality of LF bridge circuits to enable the plurality of LF bridge circuits to provide the charging DC voltage.

In an example, the power module further comprises: a first plurality of independent heat sinks, each of the first plurality of independent heat sinks associated with one of a first plurality of switches of the plurality of LF bridge circuits;

and a second plurality of independent heat sinks, each of the second plurality of independent heat sinks associated with one of a second plurality of switches of the plurality of HF bridge circuits.

In an example, the power module further comprises a plurality of jumper connector points adapted on the circuit board, where when the power module is included in a first power conversion system the plurality of jumper connector points are unconnected, and when the power module is included in a second power conversion system at least some of the plurality of jumper connector points are coupled to one or more first jumpers, wherein the plurality of LF bridge circuits are in a parallel configuration in the first power conversion system and the plurality of LF bridge circuits are in a series configuration in the second power conversion system.

In an example, when the power module is included in the second power conversion system, one or more second jumpers couple to at least others of the plurality of jumper connector points to enable bypass of at least one of the plurality of LF bridge circuits.

In another aspect, an EV charging system comprises: a plurality of first converters to receive grid power at a distribution grid voltage and convert the distribution grid voltage to at least one second voltage, each of the plurality of first converters comprising a configurable module to receive an AC or DC distribution grid voltage; at least one high frequency transformer coupled to the plurality of first converters to receive the at least one second voltage and to electrically isolate a plurality of second converters coupled to an output of the at least one high frequency transformer; and the plurality of second converters coupled to the output of the at least one high frequency transformer, where at least some of the plurality of second converters are to receive the at least one second voltage and convert the at least one second voltage to a third DC voltage and provide the third DC voltage as a charging voltage or a charging current to one or more EV charging dispensers, each of the plurality of second converters comprising the configurable module to receive the output of the at least one high frequency transformer and output the third DC voltage or an AC voltage.

In an example, the configurable module of the at least some of the plurality of second converters comprises a plurality of jumpers coupled to at least some of a plurality of jumper connector points of the configurable module to configure the configurable module as a buck/boost converter to output the third DC voltage to the one or more EV charging dispensers.

In an example, the configurable module of the at least one of the plurality of second converters to output the AC voltage does not include the plurality of jumpers.

DETAILED DESCRIPTION

In various embodiments, a configurable power module may be provided that be used in different power conversion systems. There may be a general design for the module such that it can be readily manufactured in high volumes. Then, configurable aspects can be provided such that the power module can be implemented in particular power conversion systems.

While embodiments are not limited in this regard, power modules manufactured as described herein may be implemented in electric vehicle (EV) charging systems to realize direct connection to a grid network and generation of one or more sources of charging power that can be provided to one or more EV charging stations. In this way, EVs connected to an EV charging station can be efficiently charged at a charging voltage and/or charging current that may be dynamically controlled.

Figure 1A:
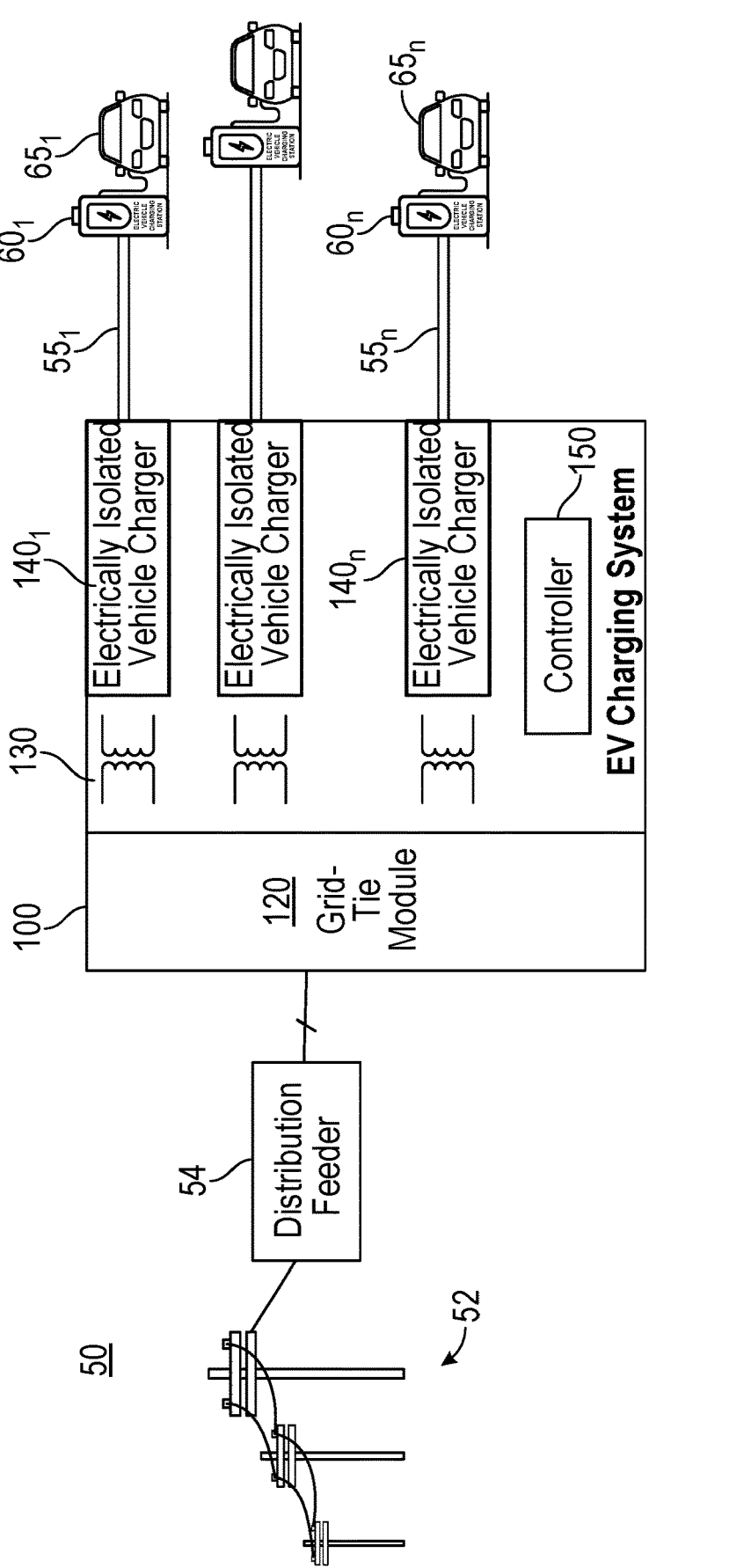
FIG. 1A is a block diagram illustrating an environment in which an EV charging system accordance with an embodiment may be used.

Referring now to FIG. 1A, shown is a block diagram illustrating an environment in which an EV charging system having power modules in accordance with an embodiment may be used. More particularly in FIG. 1A, an EV charging system 100, which may be a distributed modular-based charging system, couples between a grid network 50 (represented by transmission lines 52 and a distribution feeder 54) and multiple EV charging stations $60_1$-$60_n$ (also referred to herein as "dispensers"), each of which may be implemented with one or more EV distributors to enable charging of an EV (representative EVs $65_1$-$65_n$ are shown in FIG. 1A).

More specifically, embodiments may be used for use with distribution grid networks that provide power at medium voltage levels (e.g., between approximately 1000 volts (V) and 35000V) and at a low frequency (e.g., 50 or 60 Hertz (Hz)). For ease of discussion, understand that the terms "grid," "grid network" or "distribution grid network" are to be used interchangeably to refer to a power distribution system that provides medium voltage power at low frequency. With embodiments herein, an EV charging system such as charging system 100 may directly couple to a medium voltage distribution grid network (which may be an AC voltage grid or a DC voltage grid) without an intervening power transformer. Stated another way, embodiments provide an EV charging system that can be adapted to couple to a distribution grid network without a step up transformer, also known as a power or distribution transformer.

In this way, EV charging system 100 may directly receive incoming grid power with a grid voltage at a medium voltage level and a low frequency. As used herein, the terms "direct connection" and "direct coupling" with respect to an EV charging system mean that this system receives distribution grid power at a distribution grid network-provided grid voltage at a distribution grid network low frequency without presence of intervening components. Note that an EV charging system may couple to a grid network through a line reactor, a fuse, a circuit breaker, and/or a power circuit disconnect, and still be considered to be in a "direct coupling" with the grid network.

With embodiments, a means is provided for charging electric vehicles or other moving objects. In implementations, high power fast charging may be provided for electric vehicles by connecting to a medium voltage AC or DC distribution feeder. With an EV charging system as described herein, use of components including large magnetics components such as distribution transformer and in-line reactors may be avoided.

Still with reference to FIG. 1A, distribution feeder 54 of grid network 50 may be a medium voltage AC or DC distribution feeder. As illustrated, distribution feeder 54 is directly coupled to EV charging system 100 via three-phase connections.

Charging system 100 includes a grid-tie module 120. In embodiments herein, grid-tie module 120 may be configured to receive grid power at an incoming grid voltage (which as described above may be an AC or DC voltage) and perform an initial conversion of the incoming grid voltage to a voltage that is at different magnitude and/or frequency. Grid-tie module 120 may include one more configurable power modules as described herein. Depending on implementation, grid-tie module 120 may convert the incoming grid voltage to one or more DC or AC voltages at different magnitude or frequency. To this end, grid-tie module 120 interfaces with medium voltage AC or DC grid network 50 and utilizes power electronics converters to convert the AC or DC grid voltage to a voltage that is at different magnitude and/or frequency. Grid-tie module 120 may include multiple stages that may be isolated from each other. In other implementations, at least some of these stages may be cascaded together to increase voltage capabilities.

In particular embodiments herein, grid-tie module 120 may include power electronics-based converters to convert the incoming AC or DC grid voltage. As an example, grid-tie module 120 may include so-called H-bridge power converters to receive the incoming grid voltage and perform a voltage/frequency conversion, e.g., to a DC voltage. In turn, grid-tie module 120 may further include a first stage of a DC-DC converter to convert the DC voltage to a high frequency AC voltage (e.g., a square wave voltage) at a given high frequency (e.g., between 5 kilohertz (kHz) and 100 kHz).

As further illustrated in FIG. 1A, this high frequency AC voltage may be provided to a transformer network 130. In the embodiment shown in FIG. 1A, transformer network 130 includes multiple isolated transformers, each having a single primary winding and a single secondary winding. In other implementations a transformer network may take the form of a single transformer having a single primary winding and multiple secondary windings. In either case, transformer network 130 is configured as a high frequency transformer, e.g., to operate at frequencies between approximately 5 kHz and 100 kHz.

Still referring to FIG. 1A, the secondary windings of transformer network 130 each may be coupled to an electrically isolated vehicle charger 140₁-140ₙ. In embodiments herein, each vehicle charger 140 may be configured as a power electronics converter that converts the secondary voltage output by transformer network 130 to a voltage (e.g., DC) at a different frequency and/or magnitude. More particularly for vehicle charging as described herein, vehicle chargers 140 may include DC-DC converters to provide charge capabilities to at least one EV charging station 60.

Continuing with the above discussion in which an AC voltage is output from transformer network 130, vehicle chargers 140 may include an AC-DC converter as well as a DC-DC converter to provide charging capability at a desired charging voltage and/or charging current. Vehicle chargers 140 may include one more configurable power modules as described herein.

As shown in FIG. 1A, EV charging system 100 may be coupled to charging stations 60 via a plurality of output lines 55₁-ₙ. Although different connection topologies are possible (including direct connection as shown in FIG. 1B, discussed below), FIG. 1A shows an implementation in which each output line 55 is dedicated to a single charging station 60.

To effect control of EV charging system 100, at least one controller 150 may be present. In various embodiments, controller 150 may include one or more central processing units (CPUs) or systems on chip (SoCs), a dedicated microcontroller or other programmable hardware control circuit such as programmable logic. In one embodiment, controller 150 may form a distributed control architecture. In any case, controller 150 may be configured to execute instructions stored in one or more non-transitory storage media. Such instructions may cause controller 150 to automatically and dynamically control charging voltages and/or charging currents depending upon capabilities and requirements of charging stations 60 and/or connected EVs 65.

Figure 1B:
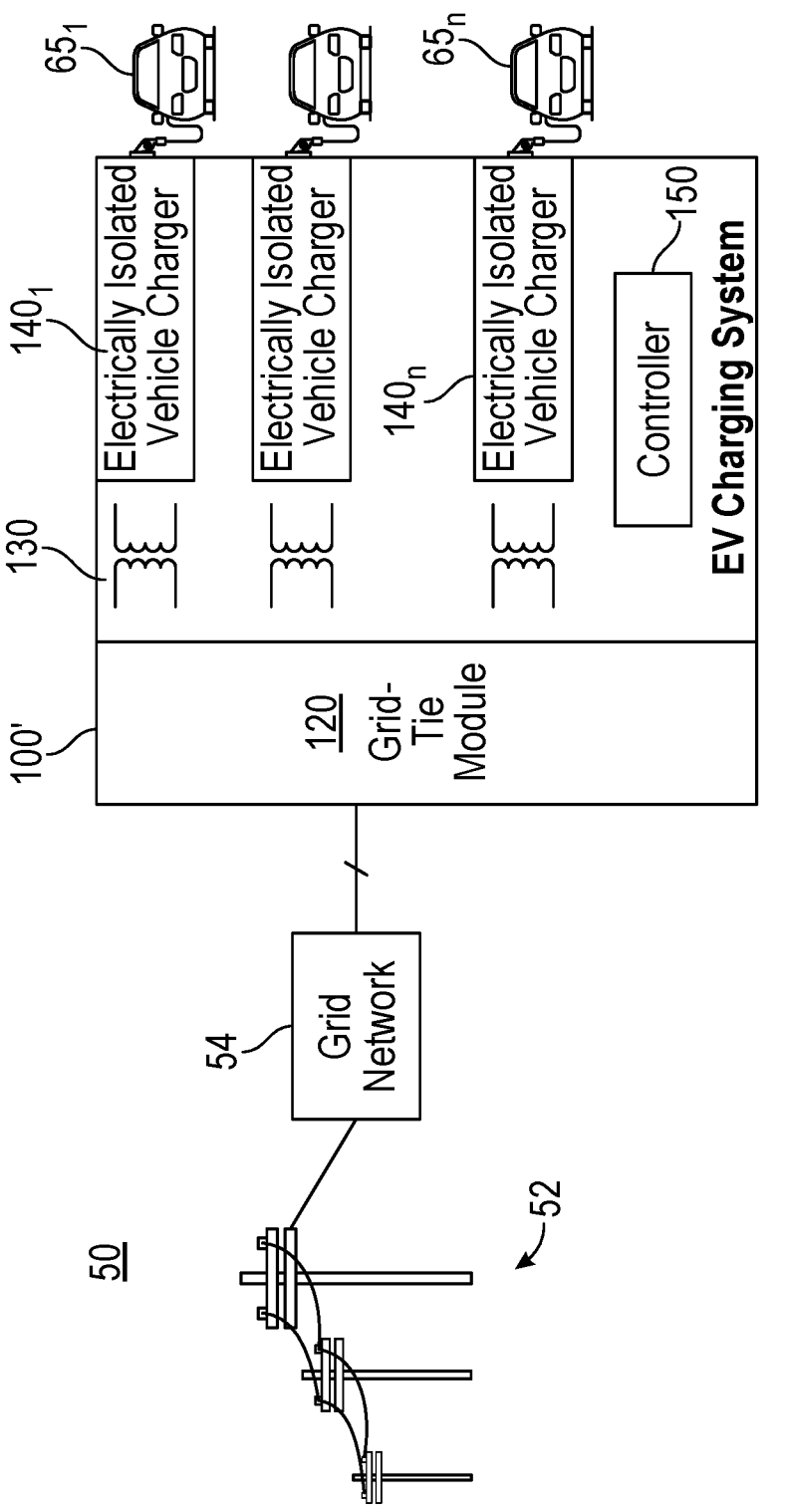
FIG. 1B is a block diagram illustrating another environment in which an EV charging system accordance with an embodiment may be used.

Referring now to FIG. 1B, shown is a block diagram illustrating another environment in which an EV charging system having a configurable power module in accordance with an embodiment may be used. More particularly in FIG. 1B, an EV charging system 100' may be configured the same as system 100 of FIG. 1A, with the sole difference being that system 100' provides vehicle charging connectors integrated therein such that output lines 55 and charging stations 60 may be eliminated. Thus as shown in FIG. 1B, system 100', via chargers 140 and integrated charging connectors, directly connect to EVs 65.

In still further implementations an EV charging system also may include capabilities to provide load power to a variety of AC loads, such as industrial facilities or so forth. In addition, the EV charging system may be configured to receive incoming energy, such as from one or more photovoltaic arrays or other solar panels and provide such energy, either for storage within the EV charging system, distribution to the grid and/or as charging power to connected EVs.

Figure 2:
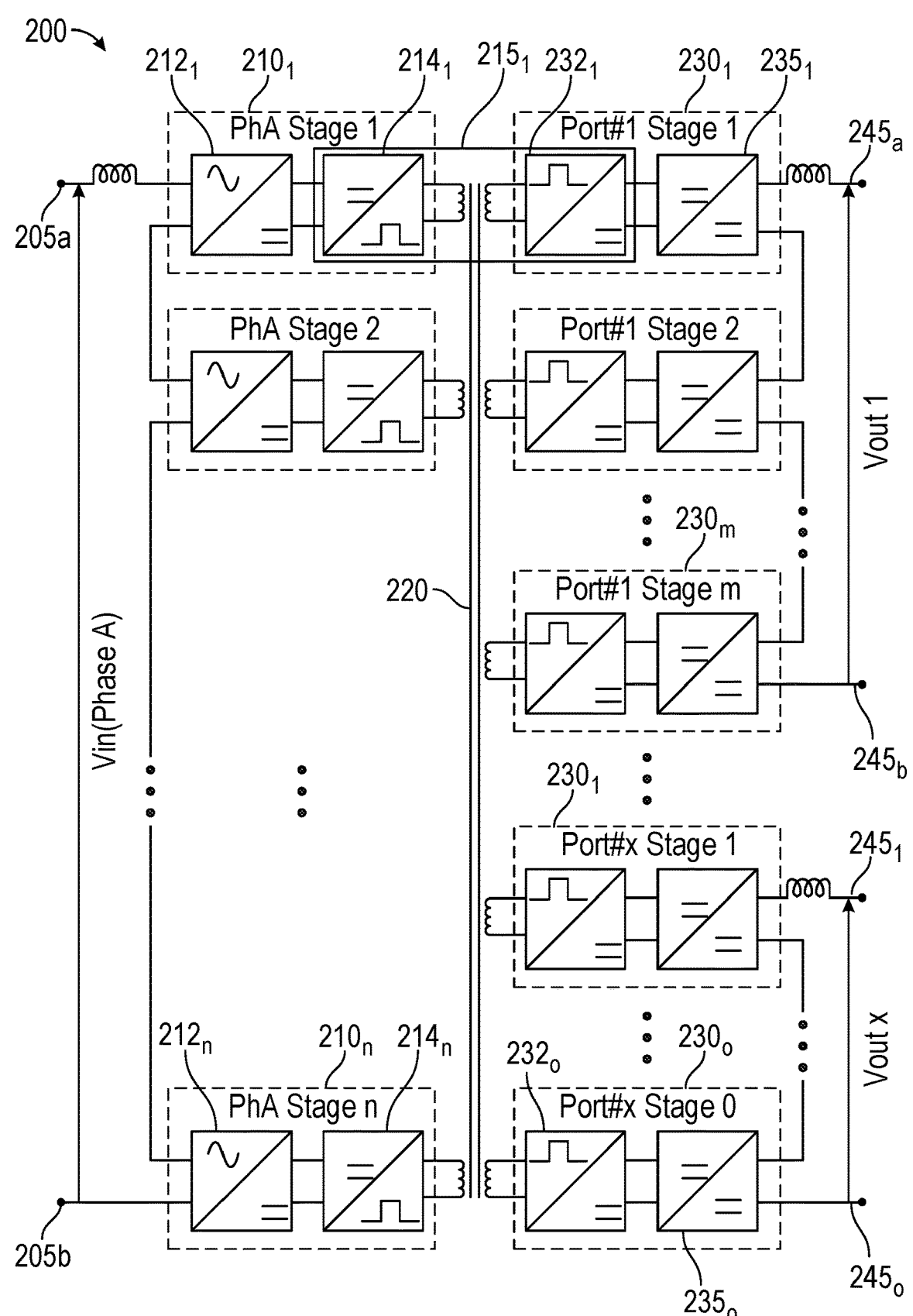
FIG. 2 is a block diagram of an EV charging system in accordance with a particular embodiment.

As described above, different configurations of EV charging systems are possible. Referring now to FIG. 2, shown is a block diagram of an EV charging system in accordance with a particular embodiment. As shown in FIG. 2, EV charging system 200 is a multi-port modular power converter that uses a single transformer. In FIG. 2, understand that a single phase is illustrated for ease of discussion. In a given charging system there may be three phases, each configured as shown in FIG. 2 or combined as a single transformer.

Incoming grid power is received at a given grid voltage via input nodes 205$_a$, 205$_b$. Although embodiments are not limited in this regard, in FIG. 2 this grid voltage may be received as a medium AC voltage, e.g., at a voltage of between approximately 1 and 50 kilovolts (kV) and at a grid frequency of 50 Hz or 60 Hz. As shown, an input inductance couples to input node 205$_a$.

The incoming voltage is provided to a plurality of input stages, each of which may include multiple H-bridge converters. More specifically, a plurality of input stages 210$_1$-210$_n$ are shown that are cascaded together. Each input stage may include a grid-side converter 212$_{1-n}$ (shown as an AC-DC converter). In turn each grid-side converter 212 couples to a DC-AC converter 214$_1$-214$_n$ of a given DC-DC converter 215$_1$-215$_n$. Thus each grid-side converter 212 receives an incoming grid AC voltage and converts it to a DC voltage, e.g., at the same or different voltage magnitude. While embodiments may typically implement converters 212 and 214 (and additional converters described below) that are symmetric, it is also possible for there to be asymmetric configurations across power stages. Input stages 210 may include one more configurable power modules as described herein.

In an embodiment, each grid-side converter 212 may be implemented as an H-bridge converter including low voltage or medium voltage switches, e.g., silicon carbide (SiC) devices. In other embodiments, each grid-side converter 212 may be formed as a multi-level rectifier. The resulting DC voltages are in turn provided to corresponding DC-AC converters 214 that act as an input stage of an isolated DC-DC converter 215. In embodiments, converters 214 may be implemented as H-bridge converters to receive the DC voltage and convert it to a high frequency AC voltage, e.g., operating at a frequency of up to 100 kHz. While a square wave implementation is shown in FIG. 2, understand that in other cases the AC voltage may be sinusoidal.

The high frequency voltage output from converters 214 may be provided to a corresponding primary winding of a transformer 220, namely a high frequency transformer. While shown in FIG. 2 as a single transformer with multiple primary windings and multiple secondary windings, in other implementations separate transformers may be provided, each with one or more primary windings and one or more secondary windings.

In any event, the galvanically isolated outputs at the secondary windings of transformer 220 may be provided to a plurality of output stages 230$_1$-230$_o$. As such each output stage 230 includes an AC-DC converter 232$_1$-232$_o$ (of a DC-DC converter 215). Thereafter, the output DC voltage may be further adjusted in magnitude in corresponding load-side converters 235$_1$-235$_o$ (and 235$_1$-235$_o$). Output stages 230 may include one more configurable power modules as described herein.

As illustrated, output stages 230 thus include a given output stage (namely stage 232) of a DC-DC converter 215 and a load-side converter 235. As shown in FIG. 2, multiple output stages 230 may couple together in cascaded fashion (e.g., either in a series connection as shown in FIG. 2 or in a parallel connection) to provide a higher output voltage and/or current depending upon load requirements. More specifically, a first set of output stages 230$_1$-230$_m$ are cascaded together and couple to output nodes 245$_{a,b}$. In turn, a second set of output stages 230$_1$-230$_o$ are cascaded together and couple to output nodes 245$_{1,o}$. The resulting outputs are thus at a given DC voltage level and may be used as a charging voltage and/or current for connected EVs. While this particular arrangement with cascaded input and output stages are shown in FIG. 2, understand that a multi-port power converter may be implemented in other manners such as using modular high frequency transformers. Still further, understand that the actual included DC-DC converters may have a variety of different topologies.

Figure 3:
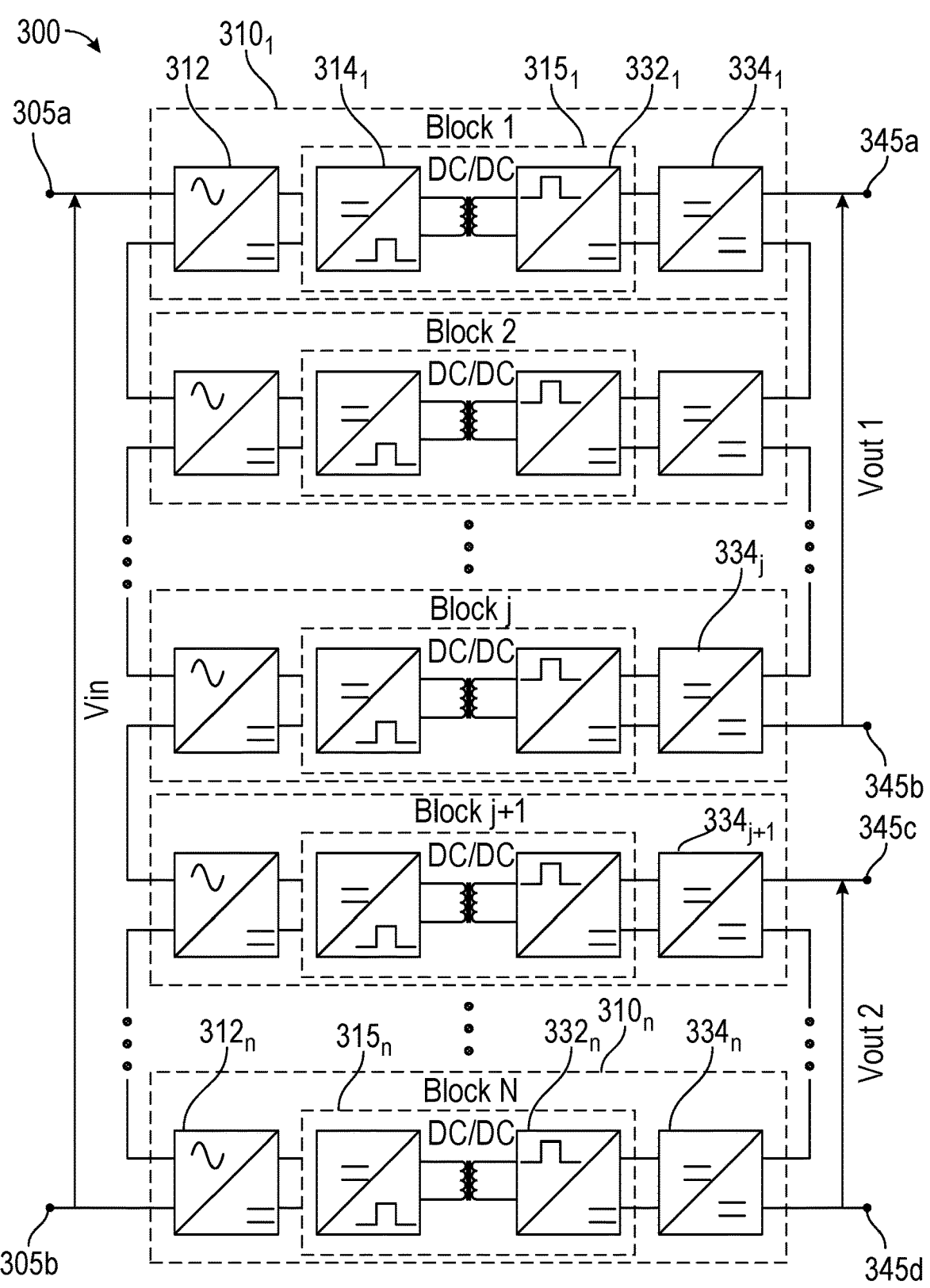
FIG. 3 is a block diagram of an EV charging system in accordance with another embodiment.

For example, in other cases a modular high frequency transformer may be used. Referring now to FIG. 3, shown is a block diagram of an EV charging system in accordance with another embodiment. As shown in FIG. 3, EV charging system 300 is a multi-port modular power converter that uses a modular transformer. As in FIG. 2, a single phase is illustrated for ease of discussion.

Incoming grid power is received at a given grid voltage via input nodes 305$a$, 305$b$. The incoming voltage is provided to a plurality of input stages, each of which may include multiple H-bridge converters. More specifically, a plurality of power converter stages 310$_1$-310$_n$ are shown. Each stage 310 may include a grid-side converter 312$_{1-n}$ (shown as an AC-DC converter) and a DC-AC converter 314$_1$-314$_n$ of a given DC-DC converter 315$_1$-315$_n$. Via independent transformers of DC-DC converters 315, a resulting electrically isolated DC voltage is provided to an AC-DC converter 332$_1$-332$_n$ and thereafter to a load-side converter 334$_1$-334$_n$. Note that operation may be similar to that discussed in FIG. 3. In one embodiment, each load-side converter 334$_1$-334$_n$ may provide a voltage to the load, e.g., connected electric vehicles. However here note that potentially different amounts of load-side converters 334 may be cascaded to provide a given DC voltage to a load (e.g., EV charging station). As one example, a first set of load-side converters 334$_1$-334$_j$ may provide a first charging voltage of approximately 1500 volts via output nodes 345$a,b$. And a second set of load-side converters 334$_{j+1}$-334$_n$ may provide a second charging voltage of approximately 1000 volts via output nodes 345$c,d$. In an embodiment, the various converters may include one more configurable power modules as described herein.

Figure 4A:
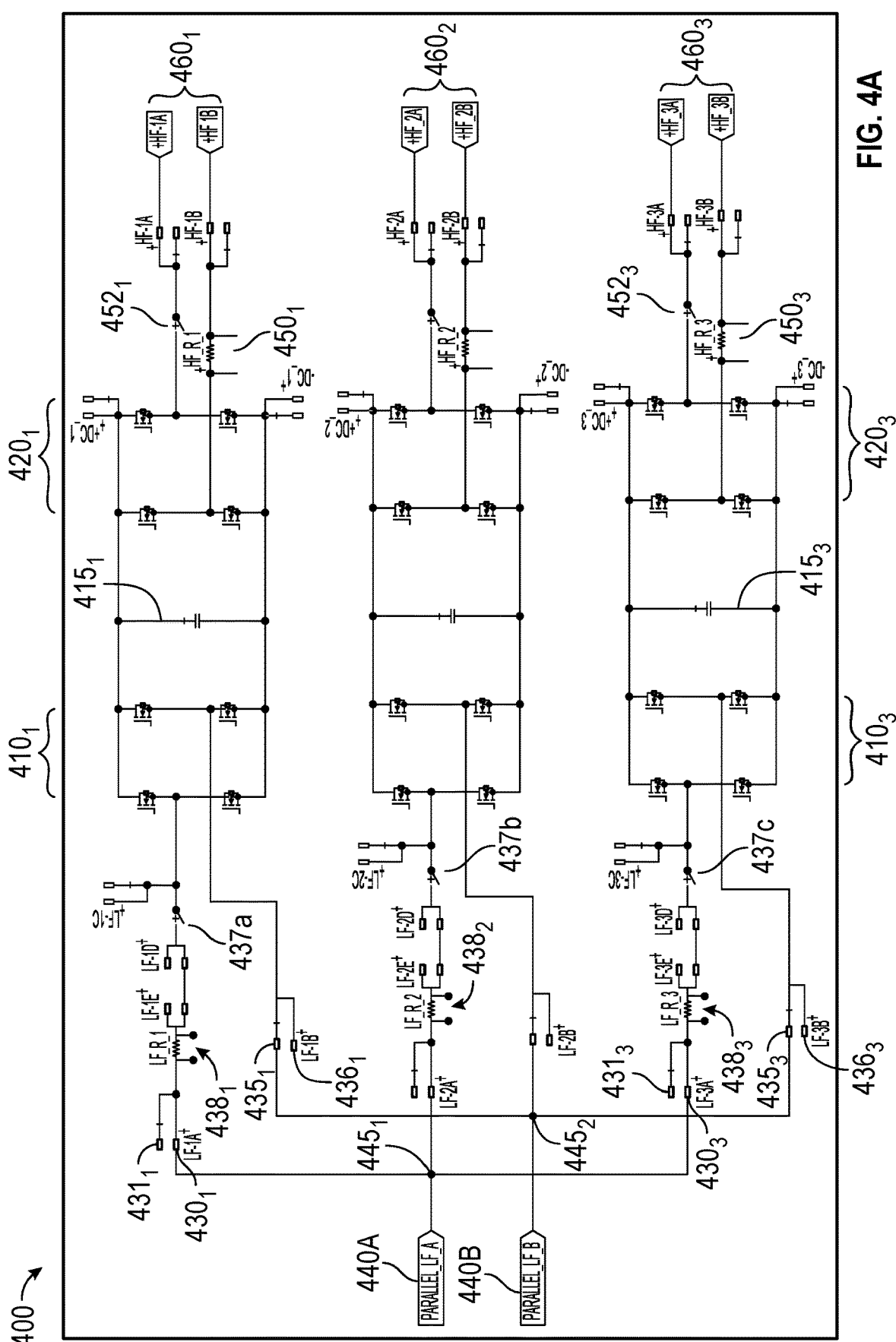
FIG. 4A is a schematic diagram of a power module in accordance with an embodiment.

Referring now to FIG. 4A, shown is a schematic diagram of a power module in accordance with an embodiment. More specifically in FIG. 4A, an intelligent power module 400 (generically referred to herein as a "power module") is a configurable power module that can be implemented in a wide variety of power conversion systems such as EV charging systems as described above, among other systems such as solid state transformers, solar power converters, STATCOMs, etc.

In FIG. 4A, a particular configuration of power module 400 is illustrated, with certain connections to enable its adaptation into a first type of power conversion system. More specifically in FIG. 4A, power module 400 is illustrated with connections to provide low frequency converters that are parallel connected and high frequency converters that have independent output connections.

The configuration shown in FIG. 4A provides for parallel-connected low frequency H-bridges that may have typical operation parameters of 800 Volts AC (VAC), line-to-line, rated 0-375 Amperes (A), and when configured for DC operation may operate at 800 VDC and 0-375 A. With respect to the high frequency bridges, they may be arranged in the FIG. 4A embodiment as independent high frequency H-bridges that may operate at typical levels of 0-800 VAC and at 125 A each. Further, these high frequency bridges may operate at higher frequencies, e.g., at approximately 40 kilohertz (kHz).

As will be described further herein, in the configuration of FIG. 4A there are jumpers or other interconnection members that couple various components within power module 400, which may distinguish this implementation from other configurations described below. A controller (not shown for ease of illustration in FIG. 4A) may control power module 400 for parallel operation, after a base power module is adapted and configured as shown in FIG. 4A, which may occur in a factory setting.

Regarding the configuration of power module 400, incoming power is received via input lines 440A,B from an input power source, such as a utility grid that operates at, e.g., 50 or 60 Hertz (Hz). To provide this voltage in parallel to the multiple bridges or stages, lines 440A,B couple to common input nodes 445$_{1,2}$, which as seen couple to input connection points 430$_{1-3}$. This input power is in turn provided to a plurality of input or first stages 410$_{1-3}$ (note that as used herein, the terms "bridge," "H-bridge" and "stage" are used interchangeably to refer to switching circuitry that performs a power conversion operation; however understand that in the above examples of EV charging systems, the term "stage" also may refer to collections of converters such as the AC-DC and DC-DC converters shown in FIGS. 2 and 3).

As seen, the plurality of first stages 410$_{1-3}$ are implemented as low frequency H-bridges that receive the incoming power and are connected in parallel. In turn, each first stage 410 couples to a corresponding DC bus 415$_{1-3}$. DC buses 415 may be implemented as capacitors that in an embodiment may be on the order of between approximately 600V and 1200V. These DC buses are each in turn coupled to a corresponding one of a plurality of output or second stages 420$_{1-3}$. In embodiments, each second stage 420 may be implemented as an H-bridge that is independently connected and thus provides output of an AC voltage at a plurality of output connections 460$_{1-3}$.

To enable the parallel interconnection shown in FIG. 4A while providing a single power module that may be used in a variety of different configurations (including series-connected low frequency stages and so forth), certain interconnections may remain unconnected in FIG. 4A. More specifically as shown in FIG. 4A, a plurality of so-called jumper connection points 431$_{1-3}$ and 436$_{1-3}$ (among others) are unconnected in this arrangement. However, in other configurations of the same configurable power module, these points may be interconnected in a given manner using interconnection members such as jumpers or other conductive members, zero ohm resistors or so forth. Note that additional interconnection members also may be present in this and other implementations.

Thus with embodiments, the configurability of power module 400 may be realized, at least in part, by different connection points that can be connected or unconnected depending on desired configuration. In the illustration of FIG. 4A, on a front end side, these connection points include input connection points 430 and jumper connection points 431 and 436; of course additional such connection points may be present. In an embodiment, each of these connection points can be implemented on a circuit board as a physical connector, contact or other conductive member to which a cable, wire or another conductive member such as a jumper wire connector or zero ohm resistor may couple.

As further shown with regard to these connection points, certain reference indicators are shown in FIG. 4A, such as LF-1A associated with input connection point 430$_1$ and HF-1A associated with output connection 460$_1$. These indicators identify interconnectivity nodes for a first low frequency converter (i.e., LF-1A) and a first high frequency converter (i.e., HF-1A). These reference indicators may be used to map the configuration in FIG. 4A to a block level view of the configuration shown in FIG. 4B, discussed below.

To enable the incoming parallel-connected power to be provided to first stages 410, a jumper is provided on each input path from input connection point 430 to first stage. Specifically as shown in FIG. 4A, a jumper is provided that couple between connection points LF-E and LF-D (generically). Note that in other implementations, a parallel configuration for a power module can be realized without using any jumpers. Stated another way, a single power module design can provide various interconnection points, where depending on desired configuration, none, some or possibly all interconnection points may be electrically connected via jumpers or other interconnection members, to effect the desired configuration.

With embodiments, a single intelligent power module design may be manufactured. Then based on factory configuration for a particular power conversion system in which the power module is to be adapted, a variety of different power module configurations can be realized. In addition to providing a single power module that can be used in different systems, understand that the intelligent power module also may be dynamically controlled to operate with unidirectional and bidirectional power flows.

Furthermore, this single power module may be used to implement both AC-DC conversion and DC-DC and DC-AC and AC-AC conversion, without any change in the actual components of the power module. Also, first stages 410 and second stages 420 may be implemented using commercially available transistors. Although embodiments are not limited in the regard, in one implementation these transistors may be insulated gate bipolar transistors (IGBTs). In one embodiment, these commercially available IGBTs may be formed in a package having the transistor and a diode in parallel. In other implementations, the transistors may be silicon metal oxide semiconductor field effect transistors (MOSFETs), silicon carbide (SiC) MOSFETs or Gallium Nitride (GaN) MOSFETs, as other examples. This use of commercially available devices stands in contrast to many types of available power modules in which custom designs are needed to configure the power module for a particular system implementation. As such, ease of design and incorporation into different systems may be realized. Also in this way reduced component counts, bills of material and reduced time to market can be realized.

Further, to enable the ability to effectively bypass certain circuits within power module 400, e.g., in case of a failure, various sensing and additional switching capabilities are provided. Specifically as shown in FIG. 4A, a plurality of current sensors 438$_{1-3}$ and 450$_{1-3}$ may be coupled to inputs of first stages 410 and outputs of second stages 420. In addition, switching circuitry 437$_{1-3}$ and 452$_{1-3}$ connected to first stages 410 and second stages 420 may be used to selectively isolate various circuitry of power module 400, e.g., due to a detected malfunction or other failure. Such operation may occur under control of a controller (not shown for ease of illustration in FIG. 4A). By way of feedback information provided by sensors 438, 450 and gate drivers monitoring signals (not shown), this controller may detect such failure and control power module 400 accordingly, as will be described further below.

Still with reference to FIG. 4A, the configurable nature of power module 400 further may be realized, in an embodiment, by way of incorporation of virtually all of the above-described circuitry on a single printed circuit board that by itself may in some cases form an enclosure for power module 400. With regard to FIG. 4A, input lines 440A,B and output lines 460$_{1-3}$ may be the only components that are not implemented on the single circuit board. Of course other implementations are possible; however, by way of this arrangement a single configurable power module may be realized that can be incorporated into a wide variety of different systems.

Figure 4B:
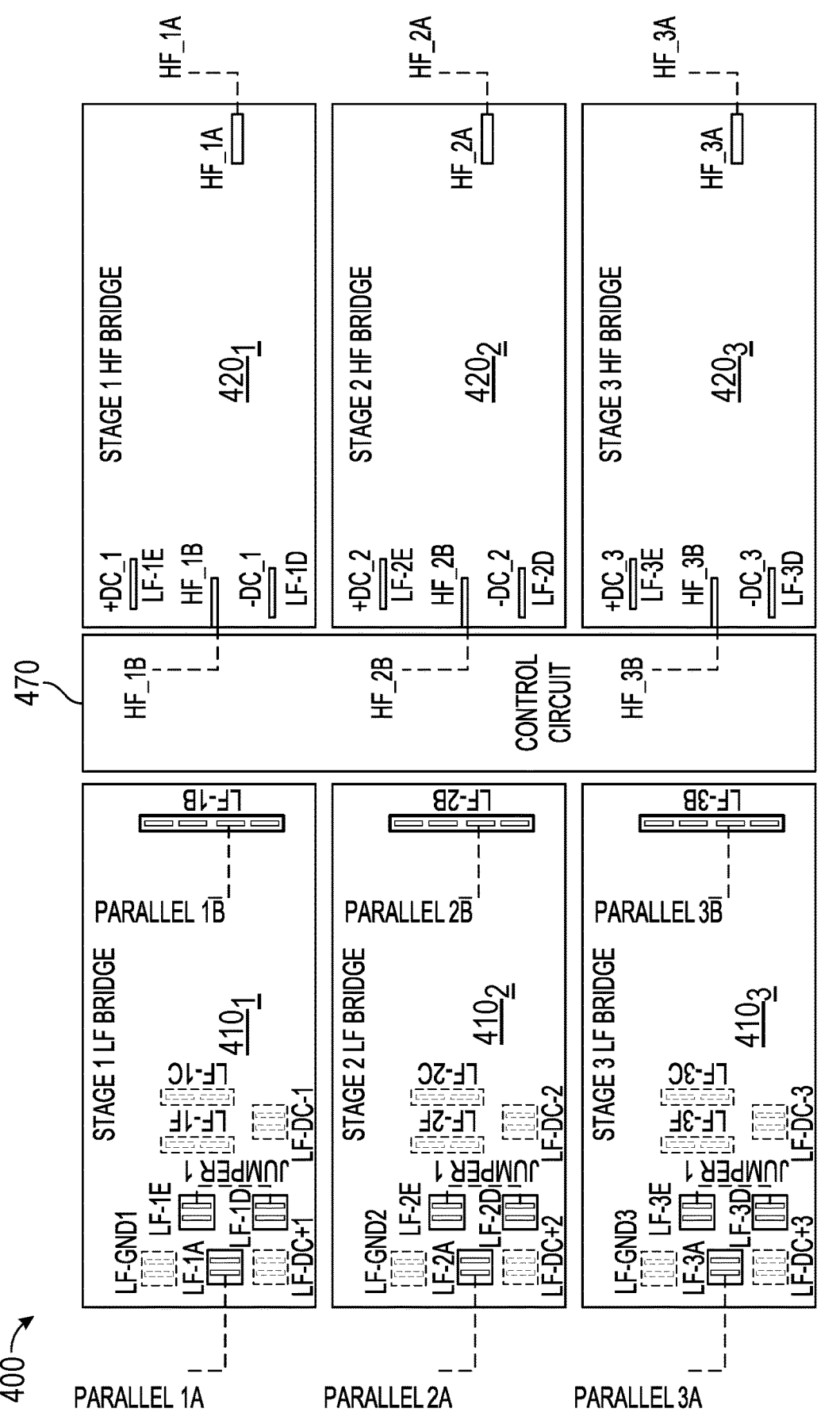
FIG. 4B is a block diagram of a power module in accordance with an embodiment.

Referring now to FIG. 4B, shown is a block diagram of a power module in accordance with an embodiment. In the illustration of FIG. 4B, the same power module 400 is illustrated in block diagram form. Thus a plurality of first stages 410$_{1-3}$ are illustrated that are implemented as parallel-connected low frequency bridges that couple via DC buses (not shown for ease of illustration in FIG. 4B) to a plurality of second stages 420$_{1-3}$ that are implemented as high frequency bridges.

FIG. 4B further illustrates a control circuit 470 that may be used to provide configuration and switching control to various components of power module 400 to enable proper interconnection and operation for a given use case. Control circuit 470 may be a hardware circuit such as one or more general-purpose processors and/or field programmable gate arrays (FPGAs) or other programmable circuitry to execute instructions that are stored in a non-transitory storage medium (also present in the power module). Responsive to the instructions (and possibly feedback information), control circuit 470 may perform various configuration and control operations for power module 400.

Still with reference to FIG. 4B, in this arrangement, the various input and output connections into and out of first stages 410 may be realized with a single jumper (coupled between nodes LF-D and LF-E, such as LF-1D and LF-1E). In turn, there are no jumpers present in second stages 420. Note that the various identified nodes (such as LF-1A, HF-1A) and so forth refer to the same nodes identified in the schematic diagram of FIG. 4A that may be implemented as various connection points. Thus for sake of exemplary illustration, inputs (Parallel 1A-3A and Parallel 1B-3B) map to input connection points 440A,B, respectively, of FIG. 4A, and similarly outputs (HF1A,1B-HF3A,3B) map to output connections 460$_{1-3}$, respectively, of FIG. 4A.

In another configuration, the same power module, by way of different interconnection of the same circuitry (such as by way of different jumpers or other interconnect members) may be configured for series-connected low frequency bridges that may operate as an AC converter or DC converter.

Figure 5A:
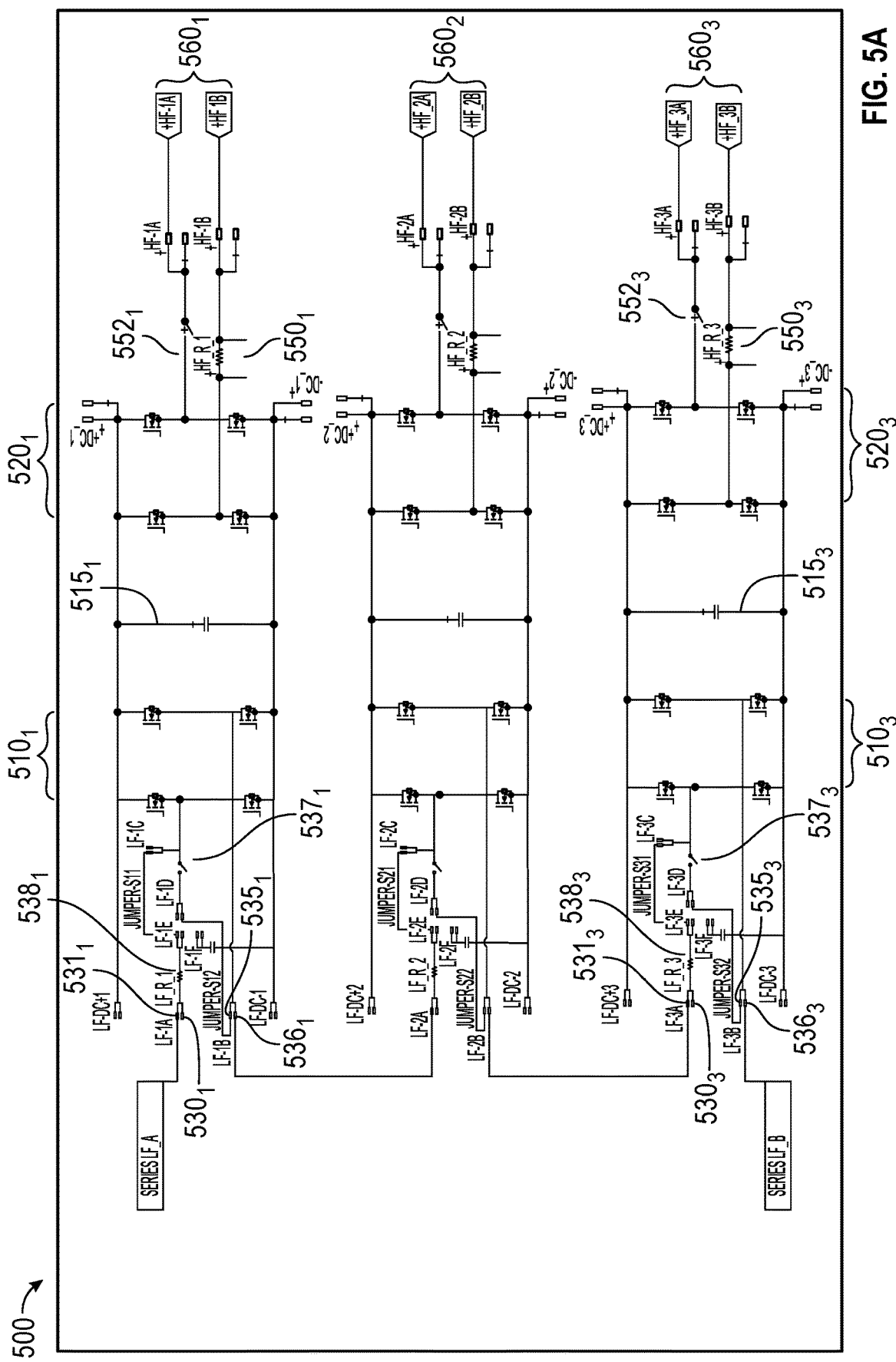
FIG. 5A is a schematic diagram of a power module in accordance with another embodiment.

Referring now to FIG. 5A, shown is a schematic diagram of a power module in accordance with another embodiment. Power module 500 of FIG. 5A includes the same components as power module 400 of FIG. 4A, but with different interconnections to provide a power module having series-connected low frequency converters. Given the similarity, the common components are not further discussed, and understand that reference numerals used in FIG. 5A generally refer to the same components as in FIG. 4A, albeit of the "500" series in place of the "400" series of FIG. 4A.

In this configuration, the AC/DC series-connected arrangement of first stages 510 may be realized by providing jumpers or other interconnects at the inputs of the stages. Thus as shown in FIG. 5A, a first series jumper is coupled between nodes LF-1B and LF-2A to series connect first stage 510$_1$ to second stage 510$_2$. And in turn, a second series jumper is coupled between nodes LF-2B and LF-3A to series connect second stage 510$_2$ to third stage 510$_3$. Additional jumpers are also connected internally to each stage, such as the jumper coupled between connection nodes LF-1C and LF-1E.

With the arrangement of FIG. 5A, the series-connected low frequency H-bridges may have typical operation parameters of 2400 VAC, line-to-line, rated 125 A, and when configured for DC operation may operate at up to 2400 VDC, and 125 A. The high frequency bridges may operate the same as in the FIG. 4A embodiment, namely as independent high frequency H-bridges that may operate at typical levels of 0-800 VAC and at 125 A each.

As further illustrated, bypass operation is possible in this implementation. Specifically here, bypass jumpers couple between nodes 530 and 535, such that when enabled, a given first stage 510 may be bypassed. Such bypass operation may occur in response to detection of a fault, which may trigger closing of a switch (e.g., relay) 537 to effect the bypass via connected jumpers.

Figure 5B:
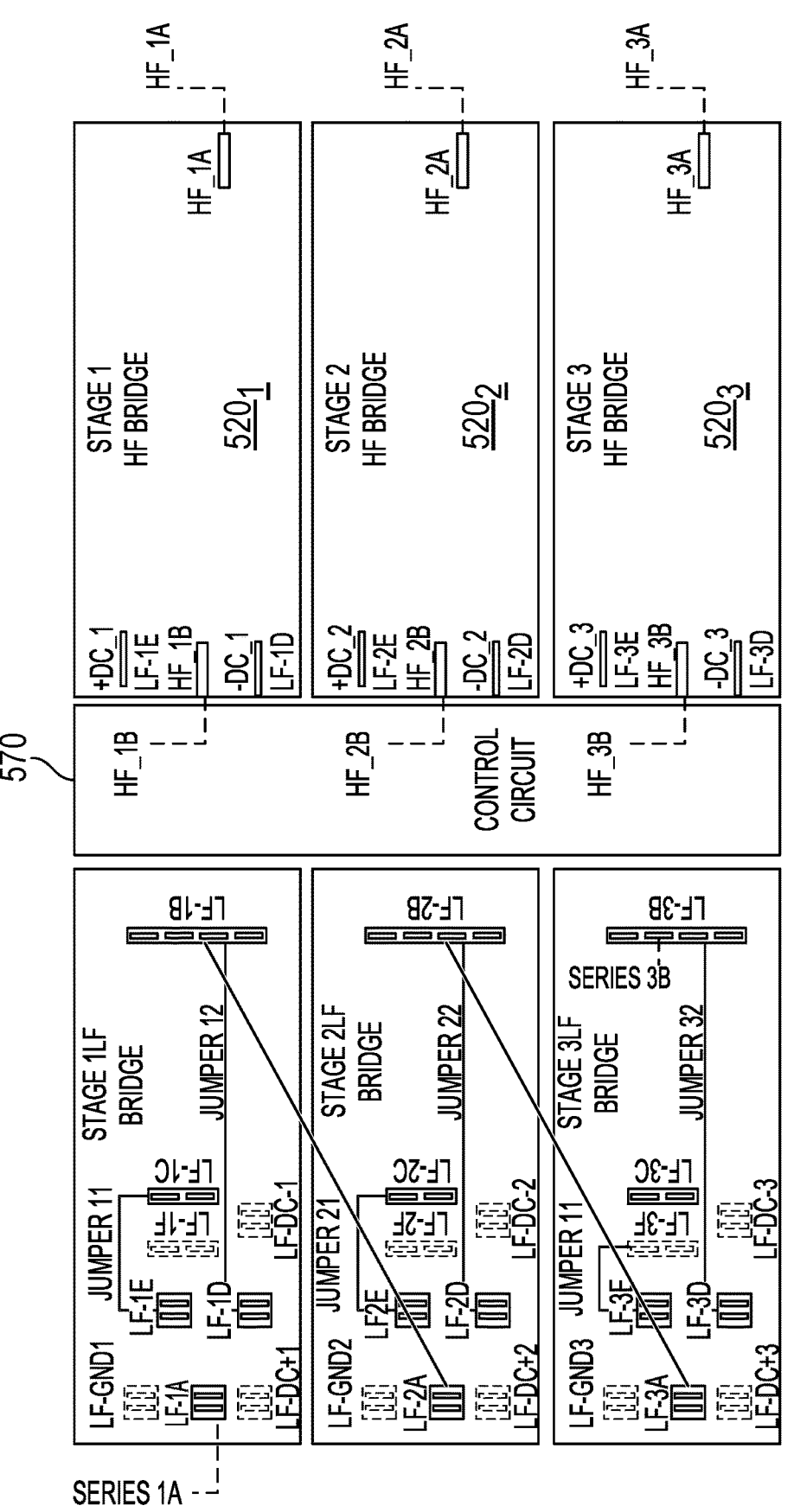
FIG. 5B is a block diagram of a power module in accordance with another embodiment.

Referring now to FIG. 5B, shown is a block diagram of a power module in accordance with an embodiment. In the illustration of FIG. 5B, power module 500 is shown with the different jumper connections to provide both a series configuration of low frequency stages and bypass capabilities. Note that in FIG. 5B, the identified nodes to which these jumpers connect are shown in the schematic diagram of FIG. 5A.

And still further configurations are possible. For example, DC or AC single or three phase/independent DC buck/boost circuits may be realized using yet another configuration of an intelligent power module in accordance with an embodiment. In such arrangements, the low frequency stages may be AC or DC series-connected by way of jumpers to enable operation at 800 V, 375 A.

Figure 6A:
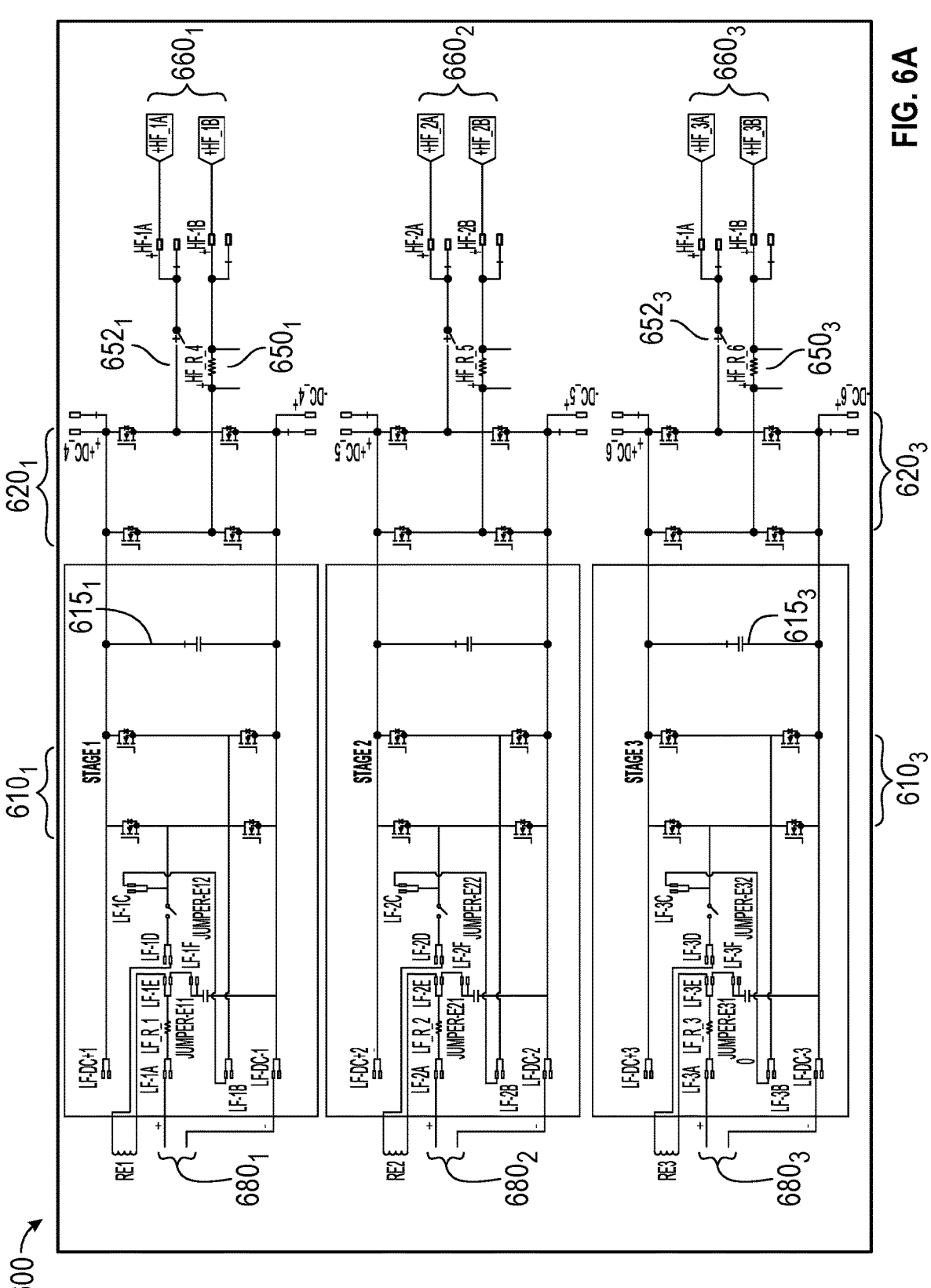
FIG. 6A is a schematic diagram of a power module in accordance with yet another embodiment.

Referring now to FIG. 6A, shown is a schematic diagram of a power module in accordance with yet another embodiment. Power module 600 of FIG. 6A includes the same components as power module 400 of FIG. 4A, but with different interconnections to provide a power module having controllable buck/boost/EV low frequency converters. Given the similarity, the common components are not further discussed, and understand that reference numerals used in FIG. 6A generally refer to the same components as in FIG. 4A, albeit of the "600" series in place of the "400" series of FIG. 4A.

In this configuration, first stages 610 are coupled in a buck/boost configuration via buck/boost jumpers which, as shown, enable coupling of the different sides of the H-bridges. In this arrangement, parallel top IGBTs and bottom IGBTs are controlled for a buck/boost converter. Note that these first stages can be coupled to receive a grid voltage (e.g., an AC or DC grid voltage). Or in this buck/boost arrangement, first stages 610 may be controlled to provide a DC voltage, to be provided to a battery in an EV implementation.

Also note in the embodiment of FIG. 6A, first stages 610 are independently connected. In different implementations by control of jumpers, first stages 610 can be connected in parallel or serial, and may be coupled to an AC or DC grid, as described above. By appropriate control of IGBTs, this single system can be used in both DC and AC applications.

For an AC application, the operation is the same as the series and parallel configurations described above with respect to power modules 400 and 500. For connection to a MV DC grid (in the grid-side section) and for an EV application, jumper settings for a buck/boost/EV mode are applicable, such that the switches are controlled to allow for bidirectional buck/boost converter operation.

As further shown, connection to external reactance (an off-board inductor Re1-3) may be provided by way of a pair of jumpers (coupling to connection nodes LF-D and LF-E, generically). Another jumper between LF-E and LF-F (generically) may be used to couple a filter capacitor. Further, connection to a given system (e.g., an EV charger) via DC voltage nodes $680_{1-3}$ may be effected by coupling to additional connection nodes (e.g., LF-1A and LF-DC-1 in the top stage $610_1$) As further shown in this configuration, an additional jumper (jumper E12 in the top stage $610_1$) couples between connection points LF-C and LF-B (generically).

Figure 6B:
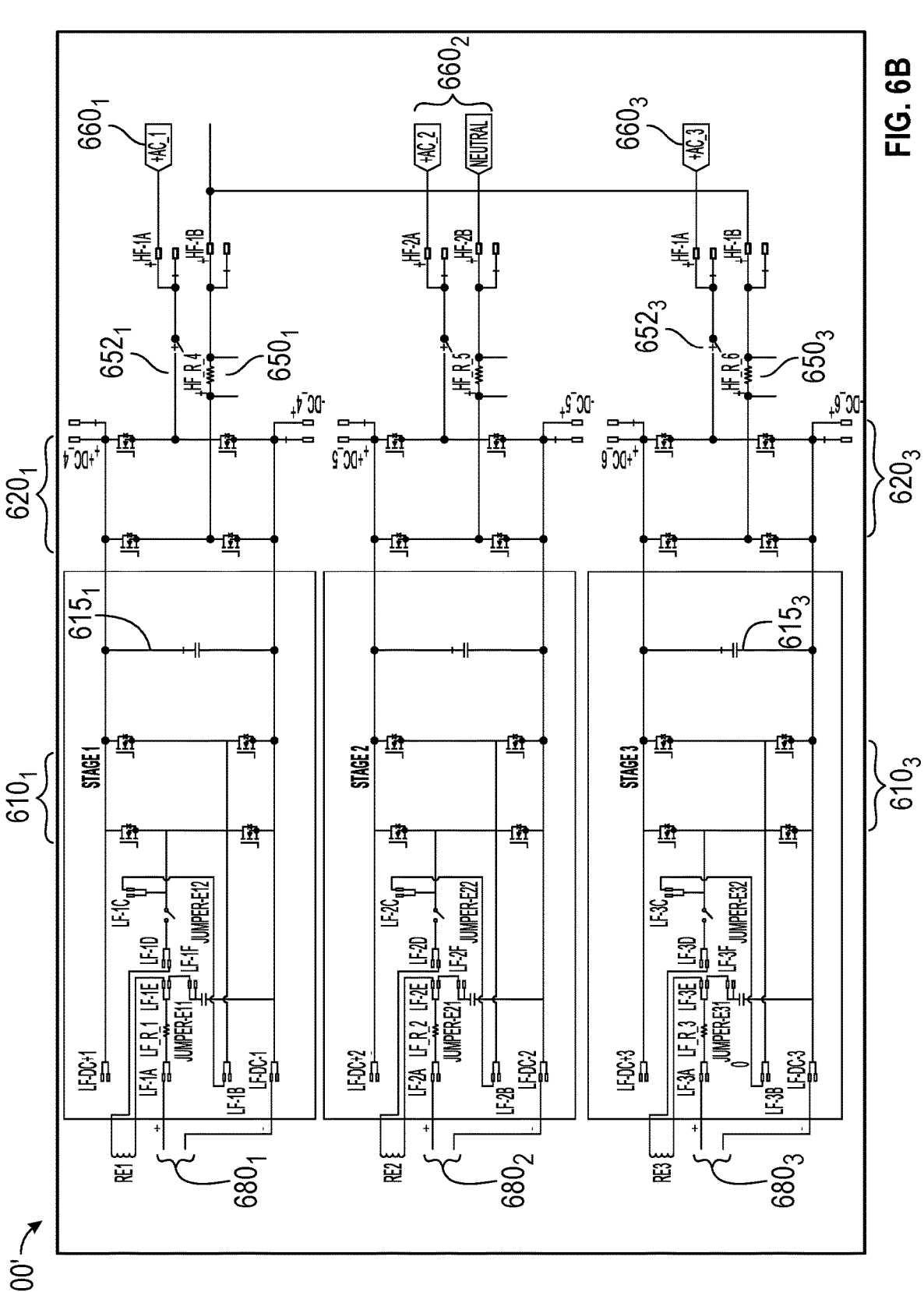
FIG. 6B is a schematic diagram of a power module in accordance with a further embodiment

In the alternate embodiment of FIG. 6B, a power module 600' may be configured the same with respect to the low frequency stages as power module 600. However in this embodiment, note that high frequency stages 630 have a common neutral point connection for 3-phase AC operation.

Thus it is further possible to configure high frequency stages 630 to have a buck/boost configuration by similarly providing buck/boost jumpers between the different sides of the H-bridges of these stages. With this arrangement, power module 600 can be implemented as an EV charger to provide a charging voltage and/or current to one or more EVs.

Figure 6C:
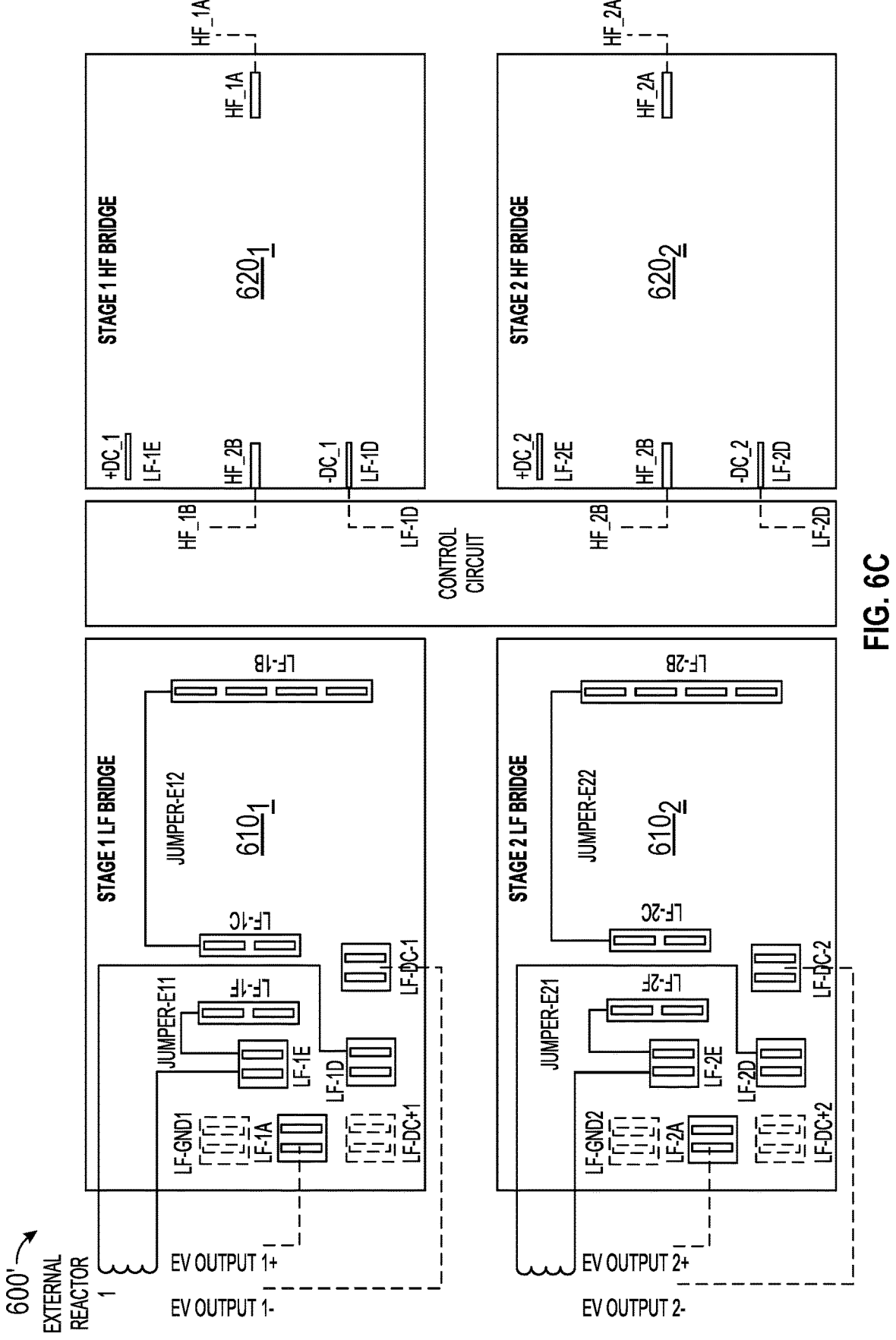
FIG. 6C is a block diagram of a power module in accordance with another embodiment.
Figure 6C:
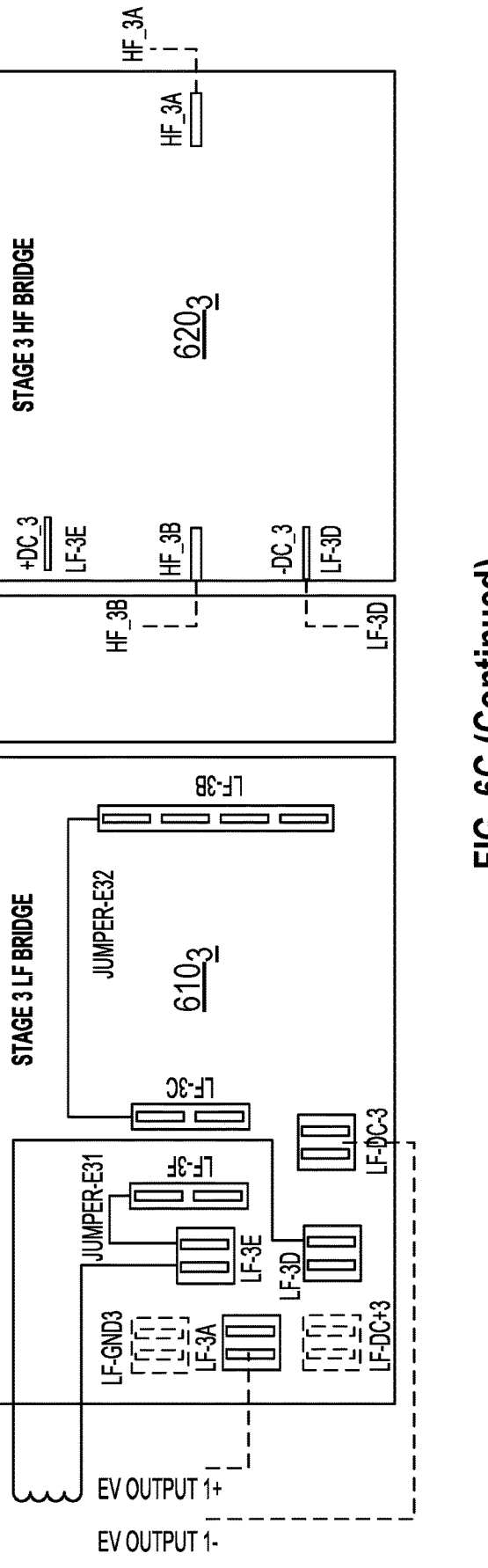

Referring now to FIG. 6C, shown is a block diagram of a power module in accordance with an embodiment. In the illustration of FIG. 6C power module 600 is illustrated with the different jumper connections to provide a buck/boost configuration of low frequency stages. Note that in FIG. 6C, the identified nodes to which these jumpers connect are shown in the schematic diagram of FIG. 6A.

In yet another implementation, a three phase AC converter may be realized by way of appropriate use of jumpers. In this way, an intelligent power module may operate at 480 VAC with three phase input/output connections and at a current capacity of 125 A. Note that three level input/output arrangement is optional.

Figure 7A:
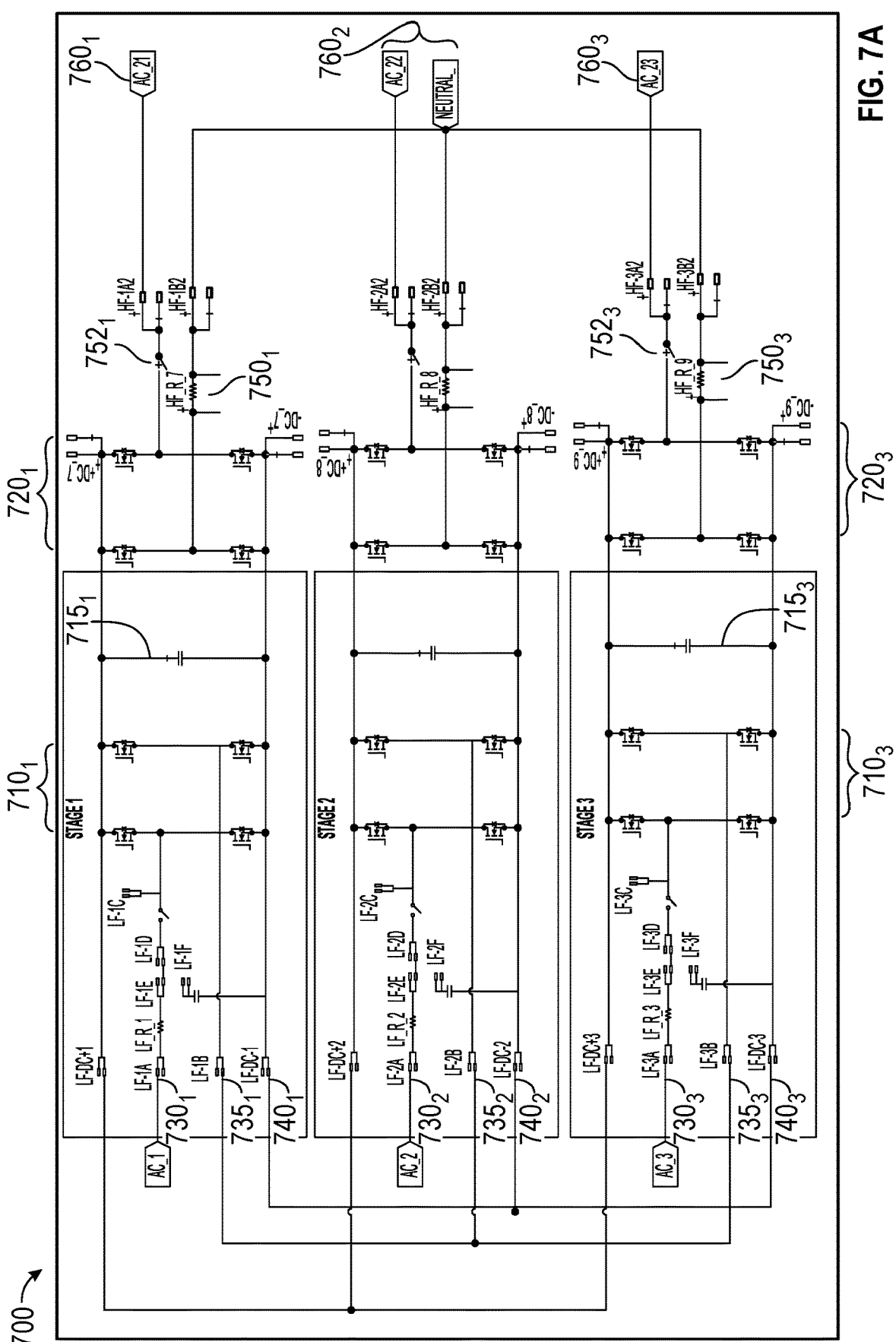
FIG. 7A is a schematic diagram of a power module in accordance with yet another embodiment.

Referring now to FIG. 7A, shown is a schematic diagram of a power module in accordance with yet another embodiment. Power module 700 of FIG. 7A includes the same components as power module 400 of FIG. 4A, but with different interconnections to provide a power module that can be used as a three phase AC converter. Given the similarity, the common components are not further discussed, and understand that reference numerals used in FIG. 7A generally refer to the same components as in FIG. 4A, albeit of the "700" series in place of the "400" series of FIG. 4A.

To effect this three phase arrangement, note that different AC inputs connect to input connection points $730_{1-3}$, and a common neutral couples to connection points $735_{1-3}$ of first stages 710. It is also possible to provide optional DC bus jumpers to the connection points illustrated in FIG. 7A. Similar coupling of a common neutral occurs at outputs of second stages 720.

Figure 7B:
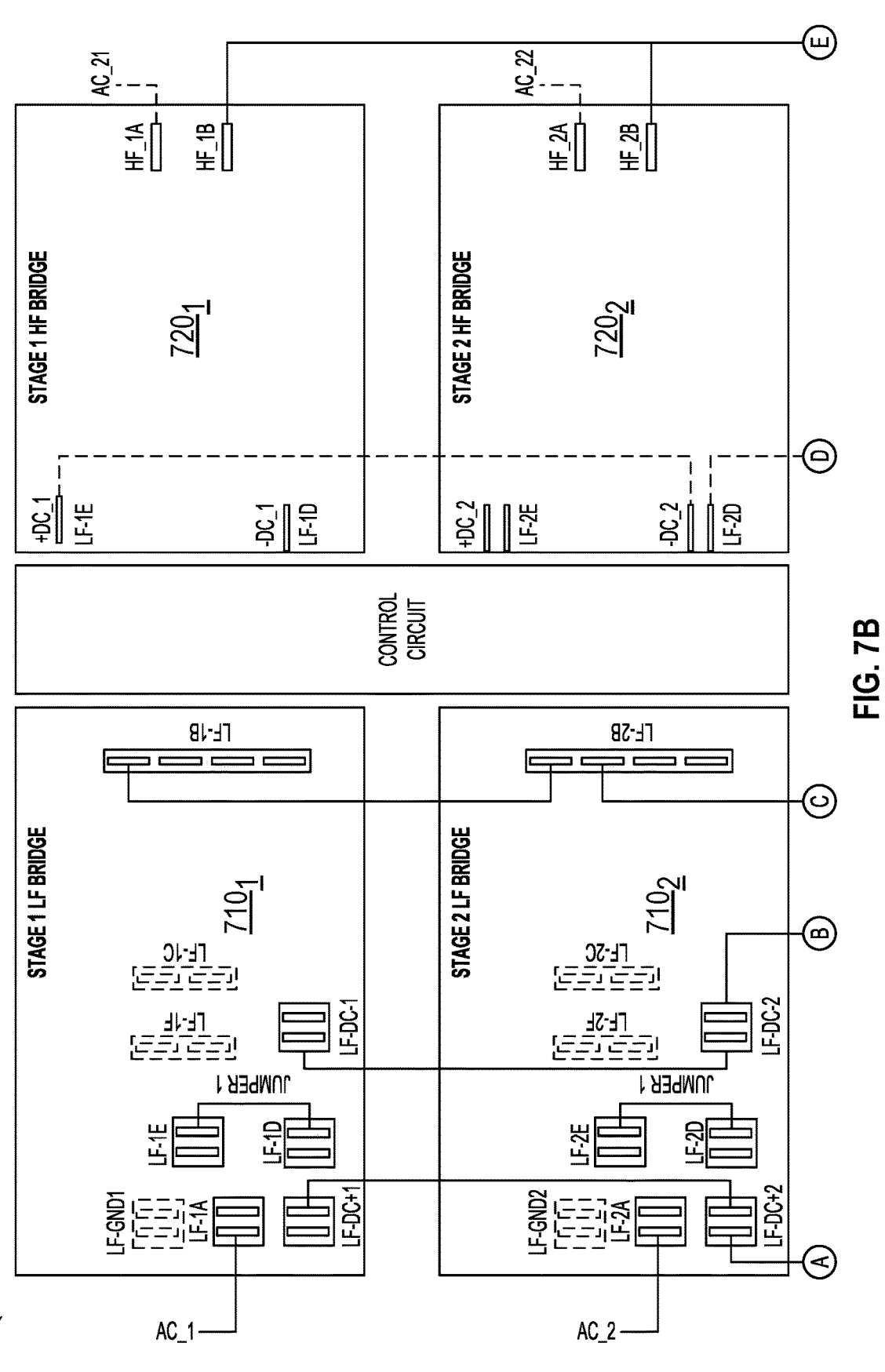
FIG. 7B is a block diagram of a power module in accordance with another embodiment.
Figure 7B:
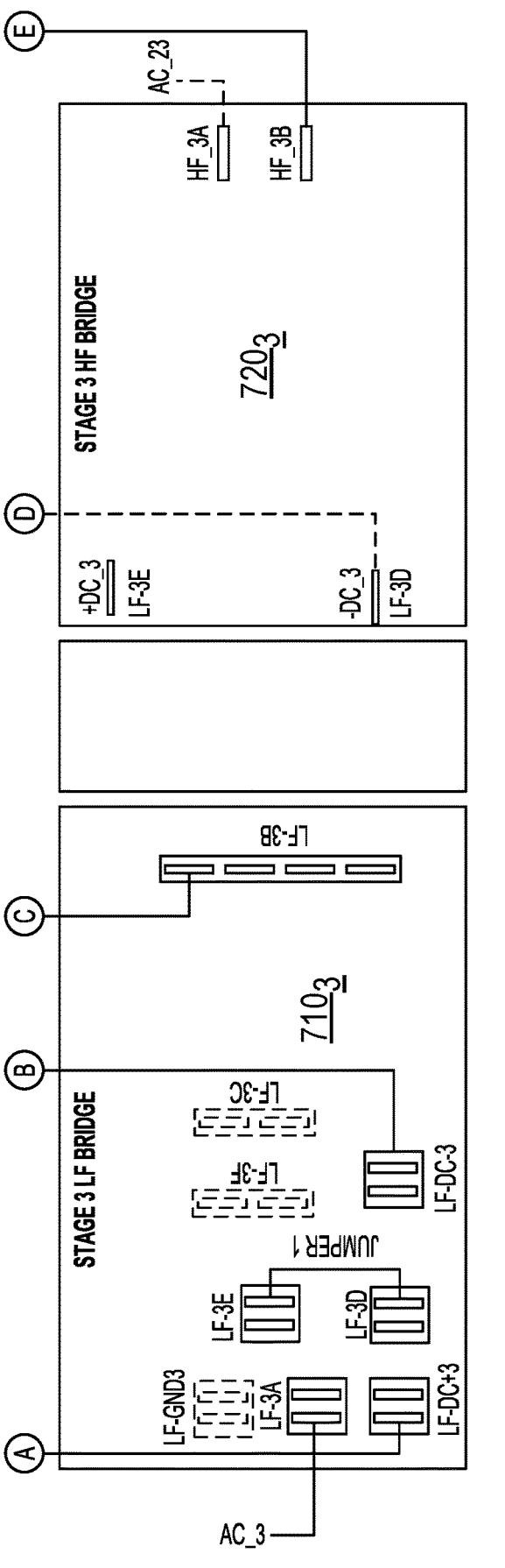

Referring now to FIG. 7B, shown is a block diagram of a power module in accordance with an embodiment. In the illustration of FIG. 7B, power module 700 is illustrated with the different jumper connections to provide neutral point connection in a three phase AC converter configuration. Note that in FIG. 7B, the identified nodes to which these jumpers connect are shown in the schematic diagram of FIG. 7A.

In still further embodiments, a multi-function power module may be realized by providing individually controlled and electrically isolated dual active bridge input/output connections. In this way selectable 24-800 VDC or 120 VAC to 480 VAC input/output connections may be realized with switching speeds of up to 80 kHz per stage.

Figure 8A:
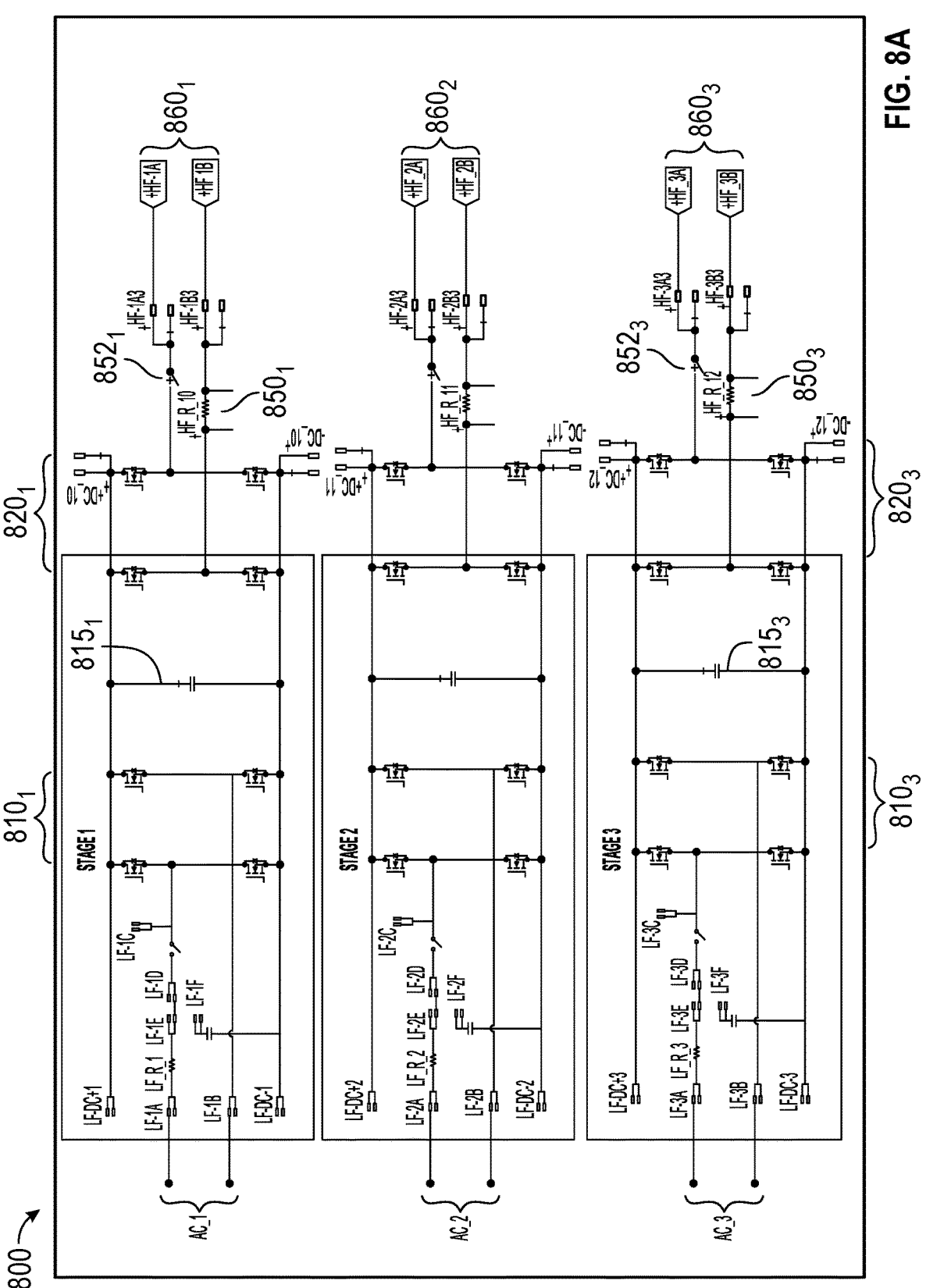
FIG. 8A is a schematic diagram of a power module in accordance with yet another embodiment.

Referring now to FIG. 8A, shown is a schematic diagram of a power module in accordance with yet another embodiment. Power module 800 of FIG. 8A includes the same components as power module 400 of FIG. 4A, but with different interconnections to provide a power module that can be used as a multi-function converter. Given the similarity, the common components are not further discussed, and understand that reference numerals used in FIG. 8A generally refer to the same components as in FIG. 4A, albeit of the "800" series in place of the "400" series of FIG. 4A. In FIG. 8A, dual inputs may be provided by way of input connection points $830_{1-3}$ and $836_{1-3}$. In other aspects, the configuration may be as in FIG. 4A.

Figure 8B:
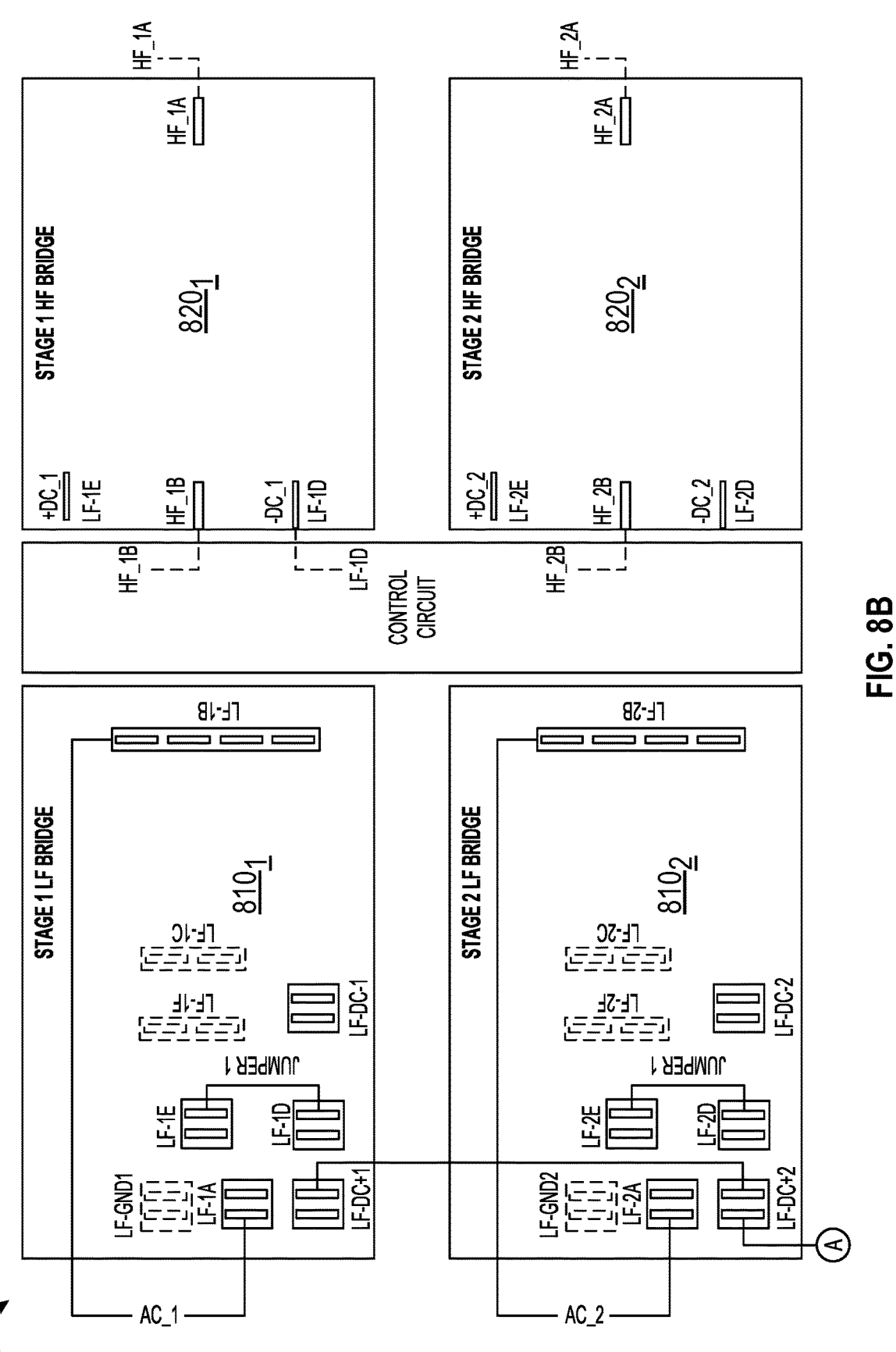
FIG. 8B is a block diagram of a power module in accordance with another embodiment.
Figure 8B:
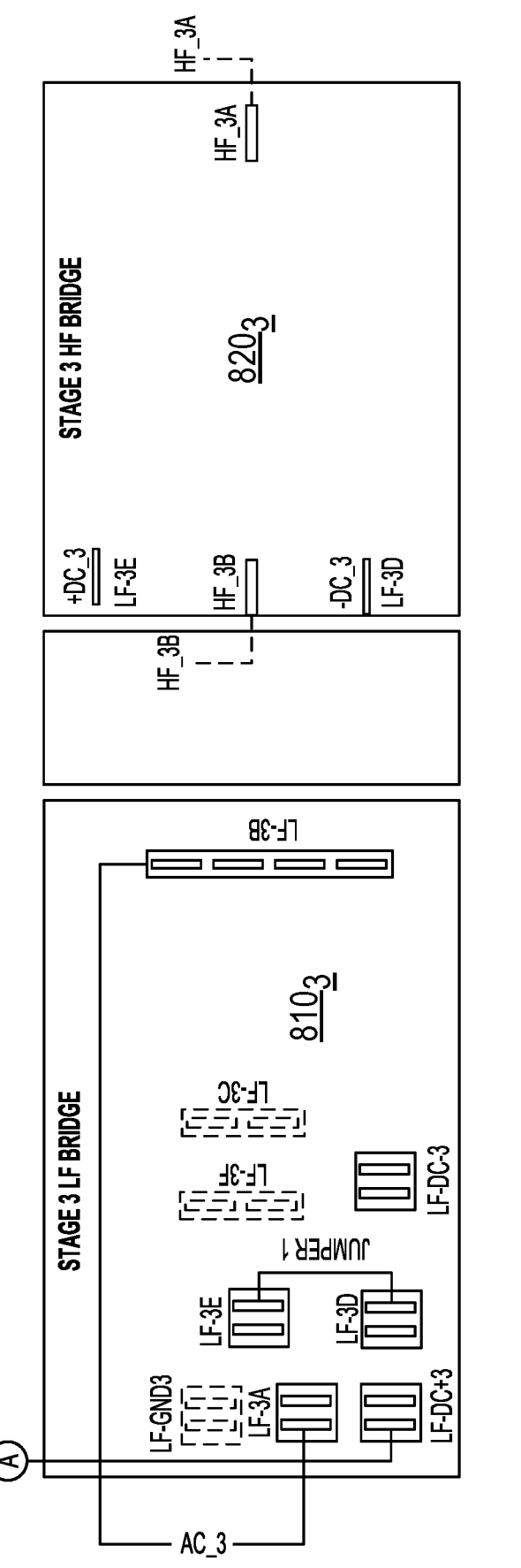

Referring now to FIG. 8B, shown is a block diagram of a power module in accordance with an embodiment. In the illustration of FIG. 8B, power module 800 is illustrated to show the input/output connections for this multi-function module.

Figure 9A:
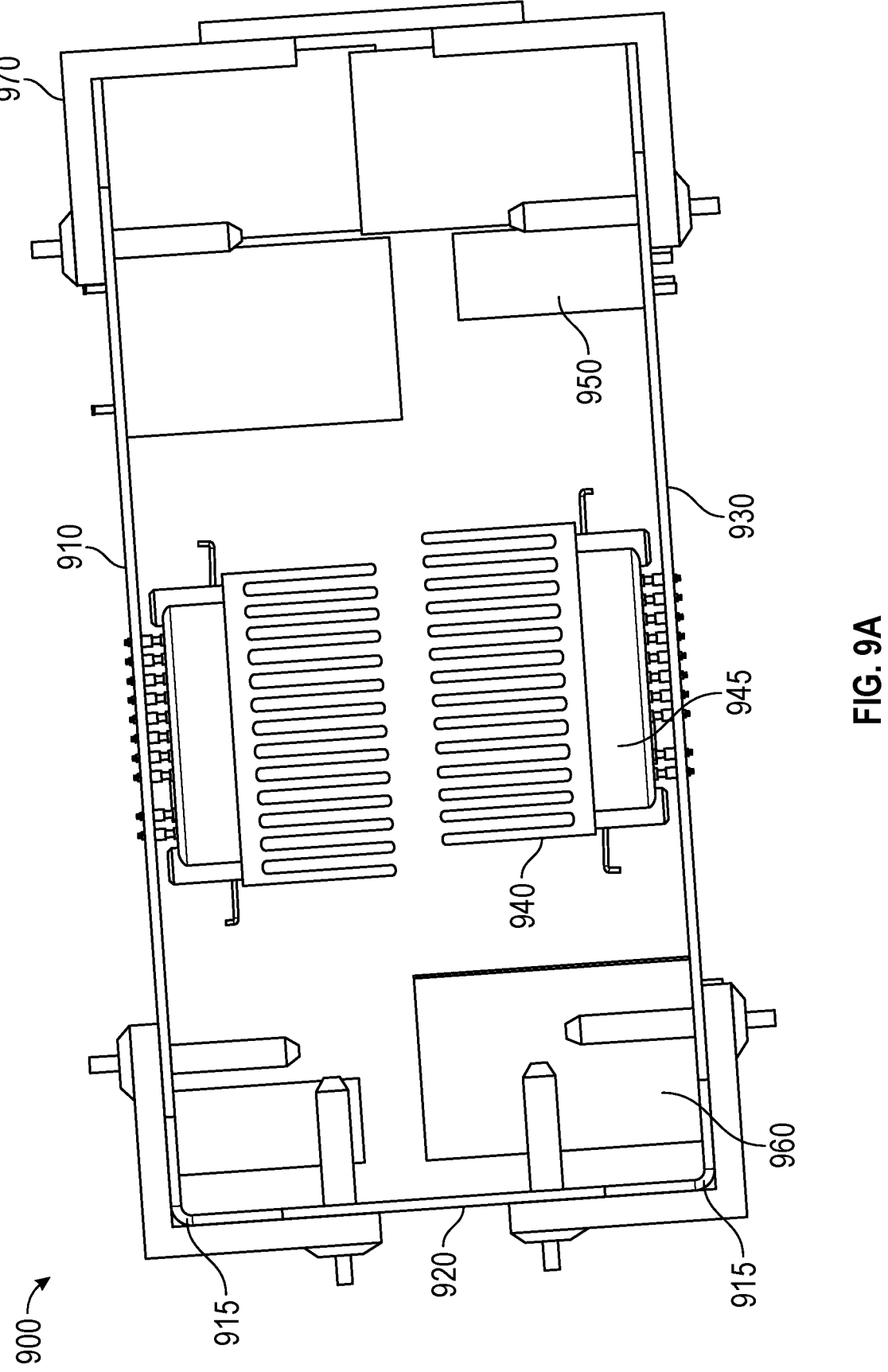
FIG. 9A is a cross-sectional view of a power module in accordance with an embodiment.

Referring now to FIG. 9A, shown is a cross-sectional view of a packaging arrangement of a configurable power module in accordance with an embodiment. As shown in FIG. 9, configurable power module 900 is implemented as a folded power module in which a circuit board on which the power module is adapted itself forms the enclosure. In FIG. 9A, a cross-sectional view is shown in which a circuit board is folded such that a first portion 910 and a second portion 930 are adapted to maintain power conversion stages, while another portion 920 is adapted to maintain control circuitry among other such circuitry.

In the high level view in FIG. 9A, the circuit board is folded via flex portions 915 such that portion 920 forms a central portion and portions 910 and 930 are peripheral portions. Note that in the implementation shown, the circuit board in turn may be formed into a fully enclosed power module via frame members 970. However this enclosure arrangement may be optional in some cases.

By way of folding the circuit board, the circuit board may provide protection to components of the power module, as the components are adapted in the interior of the formed construction. More specifically, the various switches of the power stages may be adapted on the circuit board portions and in turn, heat sinks may be adapted over the switches. In the embodiment shown, each independent heat sink 940 may be associated with a given switch 945 (e.g., IGBT) of a stage. That is, in an embodiment an independent heat sink may be present for each IGBT or other switch of the first stages and second stages. Thus with reference back to, e.g., FIG. 8A, there may be 24 individual heat sinks, each associated with one of the IGBTs.

Still with reference to FIG. 9A, additional components, including DC bus components (e.g., capacitors 960) and gate drivers 950 may be adapted on the different portions. Also understand while not shown in the high level view of FIG. 9A, various sensors, switches, connection points and so forth also may be adapted on the circuit board.

Figure 9B:
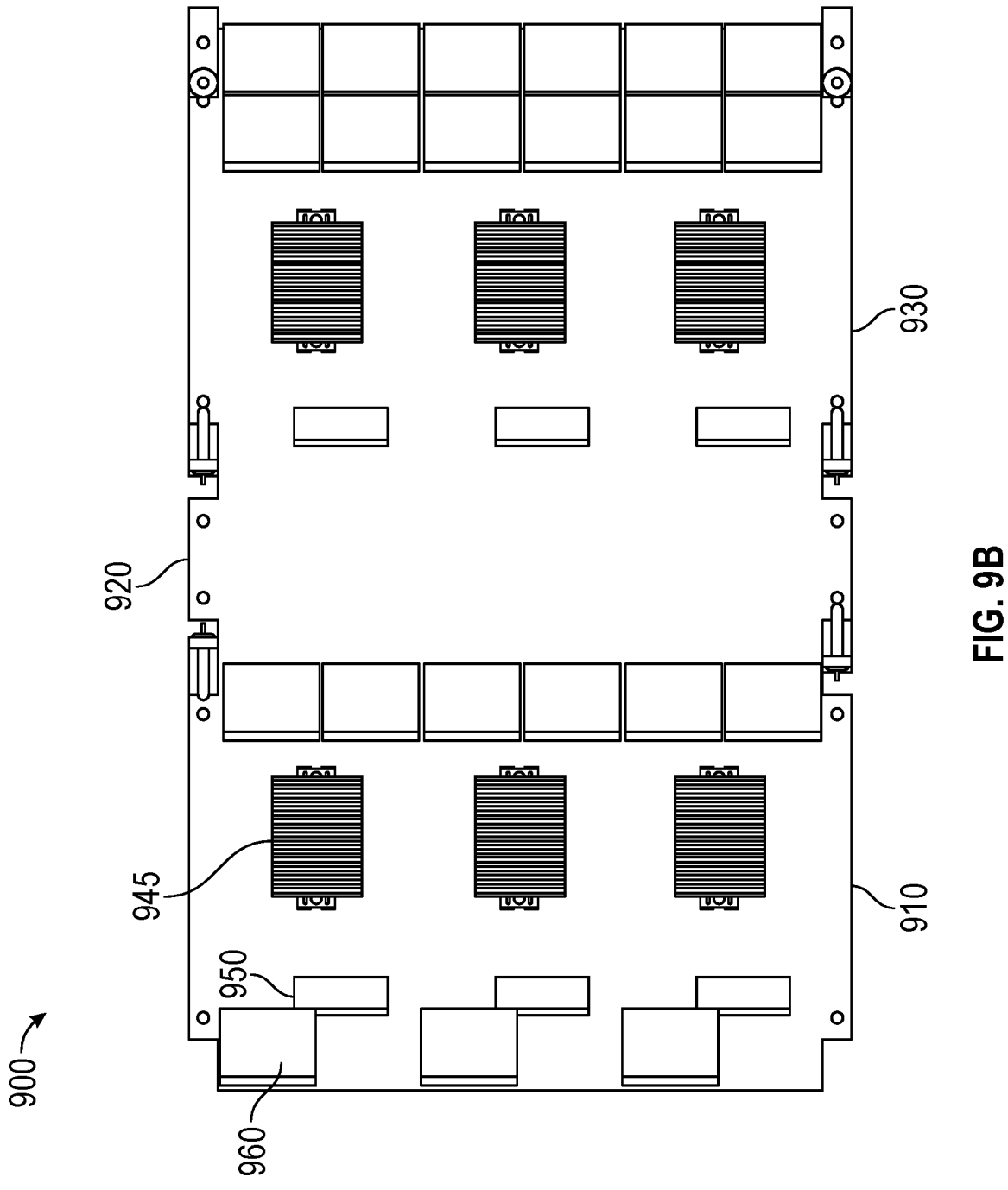
FIG. 9B is another view of a power module in accordance with an embodiment.

Referring now to FIG. 9B, shown is another view of a power module in accordance with an embodiment. As shown in FIG. 9B, power module 900 is shown in an unfolded arrangement in which a circuit board includes a first peripheral portion 910, central portion 920, and second peripheral portion 930. As further detailed in this view, a plurality of heat sinks 940 are present and associated with the various switches.

Note that with independent heat sinks for each transistor, cross-coupling may be reduced or eliminated. These heat sinks may be non-conductive, e.g., formed of aluminum. Furthermore, the heat sinks given their base design, off-the-shelf heat sink components may be used. In some cases, additional cooling may be realized by providing a fluid cooling mechanism in which various fluid pipes or so forth may be adapted throughout the unit. These conduits may then be coupled via a common coupling point such as a manifold, from which connection may be made to an external heat exchanger, as one example.

In an embodiment, the circuit board may be manufactured as a flex card with rigid portions and flexible portions. In the view of FIG. 9B all portions 910, 920 and 930 may be formed as rigid portions, and flex portions 915 formed of a flex material adapted therebetween, to enable the folding as described above. As an example, flex portions 915 may be implemented using a polyamide film without any rigid material adapted thereon, to enable its flexing and to realize the folded configuration herein. As one example, a circuit board may be implemented as a multi-layer circuit board to provide internal interconnection between various points on which components are adapted.

Note by way of a folded configuration as described herein, cooling may be enhanced due to improved airflow. Further benefits of a folded configuration as herein described may include reduced noise and increased power density.

Understand while not shown for ease of illustration in FIGS. 9A and 9B, additional components, such as fiber optic communication units, jumpers and so forth may be adapted on the exterior of power module 900, further enhancing airflow within the internal portion.

There may be additional advantages to a folded power module as described herein. As examples, easy adaptation of various circuit arrangements including series and parallel can be realized. This is so, for example, since with a series connection, a neutral point can be easily accessed by multiple converters. Further, a grounded neutral point of a center can balance common mode voltage of the upper and lower stages. Furthermore, for redundancy purposes, a redundant DC/DC converter operating at low voltage, e.g., 5V, may be run off of a given DC power bus. Therefore, if a given power supply should fail, the unit may still operate. And as described above, there are various features to enable a bypass or bridge around a failure.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A power module comprising:
a first circuit board having a plurality of layers comprising conductive traces;
a first portion of the first circuit board on which are adapted a plurality of low frequency (LF) bridge circuits, each of the plurality of LF bridge circuits to receive an incoming voltage and output a DC voltage;
a plurality of DC buses adapted on the first circuit board, each of the plurality of DC buses coupled to receive the DC voltage from one of the plurality of LF bridge circuits;
a second portion of the first circuit board on which are adapted a plurality of high frequency (HF) bridge circuits, each of the plurality of HF bridge circuits coupled to one of the plurality of DC buses to receive the DC voltage and output a second voltage; and a controller adapted on a third portion of the first circuit board, wherein the first portion opposes the second portion to form an enclosure for the power module such that the at least one circuit board comprises an exterior of the enclosure and the plurality of LF bridge circuits and the plurality of HF bridge circuits are within an interior of the enclosure, the plurality of LF bridge circuits in back-to-back relation with the plurality of HF bridge circuits, the interior of the enclosure to provide a cooling channel for airflow.

2. The power module of claim 1, wherein the power module comprises a configurable power module, wherein:
when the configurable power module is included in a first power conversion system, each of the plurality of LF bridge circuits is to receive the incoming voltage comprising the DC voltage; and
when the configurable power module is included in a second power conversion system, each of the plurality of LF bridge circuits is to receive the incoming voltage comprising an AC voltage and rectify the AC voltage to the DC voltage.

3. The power module of claim 1, wherein the controller is to configure the power module for provision of a charging DC voltage to an electric vehicle (EV) charging system, wherein the power module further comprises a plurality of jumpers coupled to a plurality of jumper connection points adapted on the first circuit board, to couple a midpoint of the plurality of LF bridge circuits to enable the plurality of LF bridge circuits to provide the charging DC voltage.

4. The power module of claim 1, further comprising:
a first plurality of independent heat sinks, each of the first plurality of independent heat sinks associated with one of a first plurality of switches of the plurality of LF bridge circuits; and
a second plurality of independent heat sinks, each of the second plurality of independent heat sinks associated with one of a second plurality of switches of the plurality of HF bridge circuits.

5. The power module of claim 4, wherein the power module further comprises a fluid cooling mechanism.

6. The power module of claim 5, wherein the fluid cooling mechanism comprises a plurality of fluid conduits adapted through the power module.

7. The power module of claim 6, wherein at least some of the plurality of fluid conduits couple to a manifold, wherein the manifold is to couple to an external heat exchanger.

8. The power module of claim 1, further comprising a plurality of jumper connector points adapted on the first circuit board, wherein when the power module is included in a first power conversion system the plurality of jumper connector points are unconnected, and when the power module is included in a second power conversion system at least some of the plurality of jumper connector points are coupled to one or more first jumpers, wherein the plurality of LF bridge circuits are in a parallel configuration in the first power conversion system and the plurality of LF bridge circuits are in a series configuration in the second power conversion system.

9. The power module of claim 8, wherein when the power module is included in the second power conversion system, one or more second jumpers couple to at least others of the plurality of jumper connector points to enable bypass of at least one of the plurality of LF bridge circuits.

10. The power module of claim 1, wherein the plurality of LF bridge circuits, the plurality of DC buses and the plurality of HF bridge circuits are adapted on an interior portion of the enclosure.

11. A power module comprising:

an enclosure formed of a foldable circuit board having a plurality of layers comprising conductive traces, the enclosure comprising:

a plurality of low frequency (LF) bridge circuits adapted on a first portion of the foldable circuit board, each of the plurality of LF bridge circuits to receive an incoming voltage and output a DC voltage;

a plurality of DC buses adapted on the foldable circuit board, each of the plurality of DC buses coupled to receive the DC voltage from one of the plurality of LF bridge circuits;

a plurality of high frequency (HF) bridge circuits adapted on a second portion of the foldable circuit board, each of the plurality of HF bridge circuits coupled to one of the plurality of DC buses to receive the DC voltage and output a second voltage; and a controller adapted on a third portion of the foldable circuit board, the third portion located between the first portion and the second portion, wherein the foldable circuit board comprises:

a plurality of rigid portions, the plurality of rigid portions comprising the first portion, the second portion, and the third portion; and a plurality of flex portions.

12. The power module of claim 11, wherein the power module comprises a configurable power module, wherein:

when the configurable power module is included in a first power conversion system, each of the plurality of LF bridge circuits is to receive the incoming voltage comprising the DC voltage; and when the configurable power module is included in a second power conversion system, each of the plurality of LF bridge circuits is to receive the incoming voltage comprising an AC voltage and rectify the AC voltage to the DC voltage.

13. The power module of claim 11, wherein each of the plurality of flex portions is adapted between two of the plurality of rigid portions.

14. The power module of claim 11, wherein the enclosure comprises a plurality of fluid conduits to provide cooling to at least some of the plurality of LF bridge circuits and at least some of the plurality of HF bridge circuits.

15. The power module of claim 11, wherein the foldable circuit board comprises a plurality of jumper connector points, wherein:

when the plurality of LF bridge circuits are to couple in parallel for a first configuration, each of the plurality of LF bridge circuits comprises a first jumper coupled between a first jumper connector point and a second jumper connector point to provide the incoming voltage to a midpoint of a first side of the corresponding LF bridge circuit; and when the plurality of LF bridge circuits are to couple in series for a second configuration, each of the plurality of LF bridge circuits comprises a second jumper coupled between the first jumper connector point and a third jumper connector point, and the second jumper connector point is unconnected.

16. An electric vehicle (EV) charging system comprising:

an enclosure formed of at least one circuit board having a plurality of layers comprising conductive traces, the enclosure comprising:

a plurality of first converters to receive grid power at a distribution grid voltage and convert the distribution grid voltage to at least one second voltage, each of the plurality of first converters comprising a configurable module to receive an AC or DC distribution grid voltage;

a plurality of DC buses, each of the plurality of DC buses coupled to receive the at least one second voltage from one of the plurality of first converters; and a plurality of second converters coupled to receive a DC voltage and convert the DC voltage to a second DC voltage and provide the second DC voltage as a charging voltage or a charging current to one or more EV charging dispensers, each of the plurality of second converters comprising the configurable module to output the second DC voltage or an AC voltage, wherein at least some of the plurality of first converters oppose at least some of the plurality of second converters, and:

the plurality of first converters are adapted on a first portion of the at least one circuit board; and the plurality of second converters are adapted on a second portion of the at least one circuit board; and a controller is adapted on a third portion of the at least one circuit board, the third portion located between the first portion and the second portion, wherein the controller is to configure the EV charging system output to the second DC voltage or the AC voltage to the one or more EV charging dispensers, and the at least one circuit board comprises a foldable circuit board having flexible and rigid portions.

17. The power module of claim 10, further comprising communication circuitry adapted on an exterior portion of the enclosure.

18. The power module of claim 1, further comprising:

a first plurality of independent heat sinks, each of the first plurality of independent heat sinks adapted over one of a first plurality of switches of the plurality of LF bridge circuits; and a second plurality of independent heat sinks, each of the second plurality of independent heat sinks adapted over one of a second plurality of switches of the plurality of HF bridge circuits.

19. The power module of claim 18, wherein at least some of the first plurality of independent heat sinks oppose at least some of the second plurality of independent heat sinks.

* * * * *